United States Patent [19]
Matsuo

[11] Patent Number: 5,838,333
[45] Date of Patent: Nov. 17, 1998

[54] IMAGE PROCESSING DEVICE AND IMAGE PROCESSING METHOD

[75] Inventor: Yasuhiro Matsuo, Ebina, Japan

[73] Assignee: Fuji Xerox Co., Ltd., Tokyo, Japan

[21] Appl. No.: 608,311

[22] Filed: Feb. 28, 1996

[30] Foreign Application Priority Data

Mar. 1, 1995 [JP] Japan ........................ 7-041641

[51] Int. Cl.[6] ........................ G06F 15/00
[52] U.S. Cl. ........................ 345/431
[58] Field of Search ............... 395/131; 345/150, 345/153, 154, 155, 431

[56] References Cited

U.S. PATENT DOCUMENTS

| | | | |
|---|---|---|---|
| 4,825,390 | 4/1989 | Van Aken et al. | 364/526 |
| 4,837,710 | 6/1989 | Zelinsky et al. | 364/521 |

FOREIGN PATENT DOCUMENTS

| | | |
|---|---|---|
| A-3-289265 | 12/1991 | Japan . |
| A-4-63064 | 2/1992 | Japan . |
| A-4-87460 | 3/1992 | Japan . |

*Primary Examiner*—Phu K. Nguyen
*Attorney, Agent, or Firm*—Oliff & Berridge, PLC

[57] ABSTRACT

An image processing device and image processing method for expanding code image data to bit map image data for use in image formation. The image processing device includes a storage device, an image interface device and a color space converter. The storage device stores bit map image data to which the code image data is expanded by an expansion device. The image interface device generates a signal indicating an attribute of a color space representing the bit map image data stored in the storage device for each pixel. The color space converter converts the image data from an image data color space to a color space that is dependent on the image formation device being used. The image data includes an image data color space attribute that identifies the color space based on the type of device that generates the image data.

15 Claims, 19 Drawing Sheets

| COLOR SPACE BITS (1:0) | COLOR SPACE CONVERSION FUNCTION |
|---|---|
| 0 | DEVICE KYMC → DEVICE KYMC |
| 1 | CIE XYZ → DEVICE KYMC |
| 2 | DEVICE YMC → DEVICE KYMC |
| 3 | DEVICE RGB → DEVICE KYMC |

| COLOR SPACE BITS (1:0) | COLOR MATCHING FUNCTION |
|---|---|
| 0 | DEFAULT COLOR MATCHING |
| 1 | A IMAGE INPUT UNIT → IMAGE OUTPUT UNIT |
| 2 | B IMAGE INPUT UNIT → IMAGE OUTPUT UNIT |
| 3 | C IMAGE INPUT UNIT → IMAGE OUTPUT UNIT |

FIG. 11

| TAG BIT (1:0) | TAG BIT FUNCTION |
|---|---|
| 0 | MISCELLANEOUS AREA |
| 1 | CHARACTER/LINE IMAGE AREA |
| 2 | GRAPHICS AREA |
| 3 | CONTONE IMAGE AREA |

FIG. 16

| TAG BIT (2:0) | TAG BIT FUNCTION |
|---|---|
| 0 | MISCELLANEOUS AREA |
| 1 | BLACK CHARACTER AREA |
| 2 | COLOR CHARACTER AREA |
| 3 | HALF-TONE CHARACTER AREA |
| 4 | FOREGROUND COLOR AREA |
| 5 | BACKGROUND COLOR AREA |
| 6 | MONOCHROME TONE (CONTONE IMAGE) AREA |
| 7 | COLOR TONE (CONTONE IMAGE) AREA |

| FUNCTION BIT (3:0) | FUNCTION | |
|---|---|---|
| 0 | USE OF CHARACTER DATA | O = USE |
| | | I = NO USE |
| 1 | COLOR DATA INVERSION | O = INVERSION |
| | | I = NO INVERSION |
| 2 | GRAPHICS/CONTONE IMAGE | O = GRAPHICS |
| | | I = CONTONE IMAGE |
| 3 | WHITE OUTPUT | O = WHITE |
| | | I = COLOR |

IMAGE PROCESSING DEVICE AND IMAGE PROCESSING METHOD

BACKGROUND OF THE INVENTION

1. Field of the Invention

This invention relates to an image processing device which receives documents prepared by a host computer or various DTP (desk-top publishing) personal computers in a PDL (page description language) or any other image data format, interprets the received image data for image formation, and reproduces documents with high quality by the target image formation device.

2. Description of the Related Art

With recent improvements in multimedia and DTP hardware and software technologies, very complicated documents have also been prepared in office application and other various applications, and demands for outputting the documents easily by various image formation devices at higher speed with higher image quality are increasing more and more; meanwhile, various image processing devices have been developed, a representative one of which is an image processing device, which receives documents prepared in the PDL (page description language), etc., via various standard interfaces including Ethernet (registered trademark), SCSI, GPIB, serial, Centronics, AppleTalk (registered trademark) as representative interfaces, interprets the received PDL files, and reproduces the documents faithfully by the target image formation device. The image processing devices generally most widely available use an electrophotographic image formation device.

Representative ones of the PDLs mentioned here include PostScript (registered trademark) of Adobe (trademark), Interpress (registered trademark) of Xerox (trademark), etc.

The recent widespread use of color electrophotographic printers, etc., is remarkable; some released image processing devices which interpret PDL files and generate images as mentioned above are compatible with color printers. The basic configuration of the image processing devices comprises image expansion means for interpreting a PDL file and performing expansion processing and a binary or multivalued full page image memory, wherein a raster image is temporarily formed in the image memory and then sent to a given printer.

FIG. 2 is a block diagram of a conventional image processing device. This image processing device requires a 4-megabyte capacity if one pixel is represented in binary or a 32-megabyte capacity if one pixel is represented by a multivalue (eight bits) an the full page image memory of one page of A3 size with 400 dpi (dote per inch). For a color image, a large-capacity image memory of 128 megabytes is required because four color pages of K (black), Y (yellow), M (magenta), and C (cyan) are required.

Generally, when an image processing device having a binary image memory executes multivalued image expansion and image generation, it often uses an area tone method such as dither or an error diffusion method. In representative image formation devices handling multivalued images, 256 levels of gray (each in eight bits) are provided and for a color image, one pixel consists of 32 bits of eight bits X four colors of K (black), Y (yellow), M (magenta), and C (cyan). With recent improvements in DTP hardware and software technologies, it has become possible to capture image elements having diversified color spaces into one document (one page) by image input units (for example, a scanner, a digital still camera, and a film projector), image input and drawing applications, etc., and a more complicated and advanced document having image elements of diversified color spaces has been prepared.

For example, PostScript Level 12 of Adobe mentioned above makes it possible to capture into a 1-page document, image elements of CIE-based color spaces including XYZ of CIE 1931 (XYZ), L*a*b* of CIE 1976 (L*a*b*), and RGB of calibrated R (red) G (green) B (blue) space as representative spaces, device RGB and device K (black) Y (yellow) M (magenta) C (cyan) that input devices have, and other special color spaces.

To capture image elements having different color spaces as a PDL file, the image elements are captured into the PDL file with CIE-based color spaces all converted into XYZ color space of CIE tristimulue values and other color spaces intact.

Normally, when a PDL file such that a 1-page document contains image elements having different color spaces as described above is received, the image processing device in the prior art performs conversion processing into color space similar to color space of an image formation device intended by the image processing device and performs image expansion processing. At the time, it performs the color space conversion processing by software as follower For example, complete conversion processing from general device RGB to device KYMC is represented by the following calculation expressions and these calculations are executed by software:

c=1.0 - red (R)
m=1.0 - green (G)
y=1.0 - blue (B)
k=min (c, m, y)
C=min (1.0, max (0.0, c - UCR (k)))
M=min (1.0, max (0.0, m - UCR (k)))
Y=min (1.0, max (0.0, y - UCR (k)))
K=min (1.0, max (0.0, BG (k)))

where BG (k) and UCR (k) are an Indian ink composite function and a UCR (ground color) function and vary depending on the characteristics of the target image formation device.

Here, the complete conversion processing from device RGB to device KYMC is shown; it is also well known that in some image processing devices, required internal color space and color space conversion processing are divided into several stages such as input device → device → output device. Normally, operations or comparison processing of the color space conversion processing shown by the expressions as mentioned above is performed for all pixels for each pixel.

A document having image elements input through different image input units can also be represented in the PDL and can be prepared as a file. When a PDL file is created, the image elements input through different image input units and contained in the document are converted into input/output unit independent, proper color space and format defined in the PDL and described. The image processing device interprets the PDL description and performs expansion processing in the space resolution and graduation resolution of the image memory of the image processing device. Normally, the image processing device performs device dependent color space conversion processing and color matching processing proper to the image processing device in image expansion and generation processing; it executes various processes for providing color output images for faithfully reproducing input images.

For example, an image processing device is proposed in Japanese Patent Unexamined Publication No. Hei 3-289265, wherein image data of image elements input through an image input unit such as a scanner is received in a color space such as R, G, B dependent on the image input unit and is converted into triatimulus values X, Y, Z independent of image input/output units, then the conversion results are furthermore converted into CIE 1976 L*, a*, b* and color gamut matching processing and color matching processing are performed, then ink amounts of Y (yellow), M (magenta), C (cyan), etc., required for image formation and amounts of ground color removal and Indian ink for K (black) generation are calculated and tone control processing is performed for providing image output for faithfully reproducing input image color.

On the other hand, color matching processing of a similar concept is also included in PostScript Leval 2 of Adobe; a frame is included wherein when a PostScript file is created for image formation in an image input/output/generation/ edit device of a host computer, etc., color spaces dependent on image input units are converted into CIE-based tristimulus values independent of devices and a PostScript file is created in the host computer and when image expansion and generation processing is performed in an image processing device, a CIE-based color rendering dictionary is referenced and color space conversion processing from color space independent of image input/output units to color space dependent on image input/output units and color matching processing are performed for providing output images for faithfully reproducing input image color independently of the image input/output units.

Recently, DTP software houses, etc., have provided color matching frame work software products named color management devices for performing color matching by a similar method. Representative color management devices include ColorSync of Apple, EfiColor of EPI, etc. The basic concept of the color matching technique used with these color management devices is as follows Information called a device profile concerning image input/output units for enabling conversion from color space dependent on image input/output units to color space independent of image input/output units (for example, CIE 1976 L*, a*, b* or X, Y, Z color space) or vice versa is held by the frame software of the color management device and based on the information, image data input from or output to image input/output units is converted into color space independent of the image input/output units and input/output processing is performed, whereby easy color matching processing is performed between the image input/output units.

However, to basically perform PDL interpretation processing and expansion processing in such a conventional image processing device as discussed above, all image data expanded In one color space that the image processing device or image formation device has must be converted, thus it takes very long time in color space conversion processing or color matching processing.

To basically perform PDL interpretation processing and expansion processing in the image processing device or described in the prior art, color matching processing as performed only for one determined image input/output unit; if one document contains image element data input through different image input units and dependent on the image input units, color matching processing is performed only for one determined image input/output unit and different color matching processing cannot be performed for each image element input through different image input units and requiring different color matching processing. Although different color matching processing needs to be performed for image elements having the same color space according to attributes of spatial frequencies, etc., of other image elements, they are all processed in a one-dimensional manner as one image element having the same spatial frequency.

SUMMARY OF THE INVENTION

This invention has been made in view of the above, and therefore an object of the invention is to provide an image processing device which enables high-speed image formation processing by efficiently performing color conversion processing or color matching processing for image elements having different color space attributes.

To solve the above problem, according to one aspect of the invention, there is provided an image processing device comprising:

means for expanding code image data to bit map image data to be used for image formation;

means for storing the bit map image data to which the code image data is expanded by the expansion means;

means for generating a signal indicating an attribute of a color space representing the bit map image data stored in the storage means for each pixel; and means for making color conversion of each pixel from the color space attribute indicated by the signal generated by the generation means to a color space attribute dependent on an image formation device.

The color space attribute may indicate the type of color space.

The color space attribute may be the type of color space dependent on a device generating the code image data.

The image processing device may further include image formation means for forming an image of the bit map image data with each pixel subjected to color conversion by the color conversion means.

The color conversion means can execute color conversion in synchronization with image formation speed.

The image processing device may further include means for storing the color space type generated by the generation means, wherein the color conversion means executes color conversion from the color space type stored in the color space type storage means.

The generation means can generate the color space type from a command of the code image data.

According to another aspect of the invention, there is provided an image processing method comprising the steps of:

expanding code image data to bit map image data to be used for image formation;

storing the bit map image data to which the code image data is expanded in the expanding step;

generating a signal indicating an attribute of a color space representing the bit map image data stored in the storing step for each pixel; and making color conversion of each pixel from the color space attribute indicated by the signal generated in the third step to a color space attribute dependent on an image formation device.

To process a document containing image elements requiring different image processing in one image, the image processing device of the invention generates attribute information of each image element and makes color conversion of each pixel of bit map image data to be used for image formation.

The above and other objects and features of the present invention will be more apparent from the following description taken in conjunction with the accompanying drawings.

BRIEF DESCRIPTION OF THE DRAWINGS

FIG. 11 is an illustration showing a tag bit function table contained in the image processing device according to the third embodiment of the invention;

FIG. 16 is an illustration showing a tag bit function table contained in an image processing device according to a fourth embodiment of the invention;

DETAILED DESCRIPTION OF THE PREFERRED EMBODIMENTS

Referring now to the accompanying drawings, a description will be give in detail of preferred embodiments of the invention.

Figure 1:
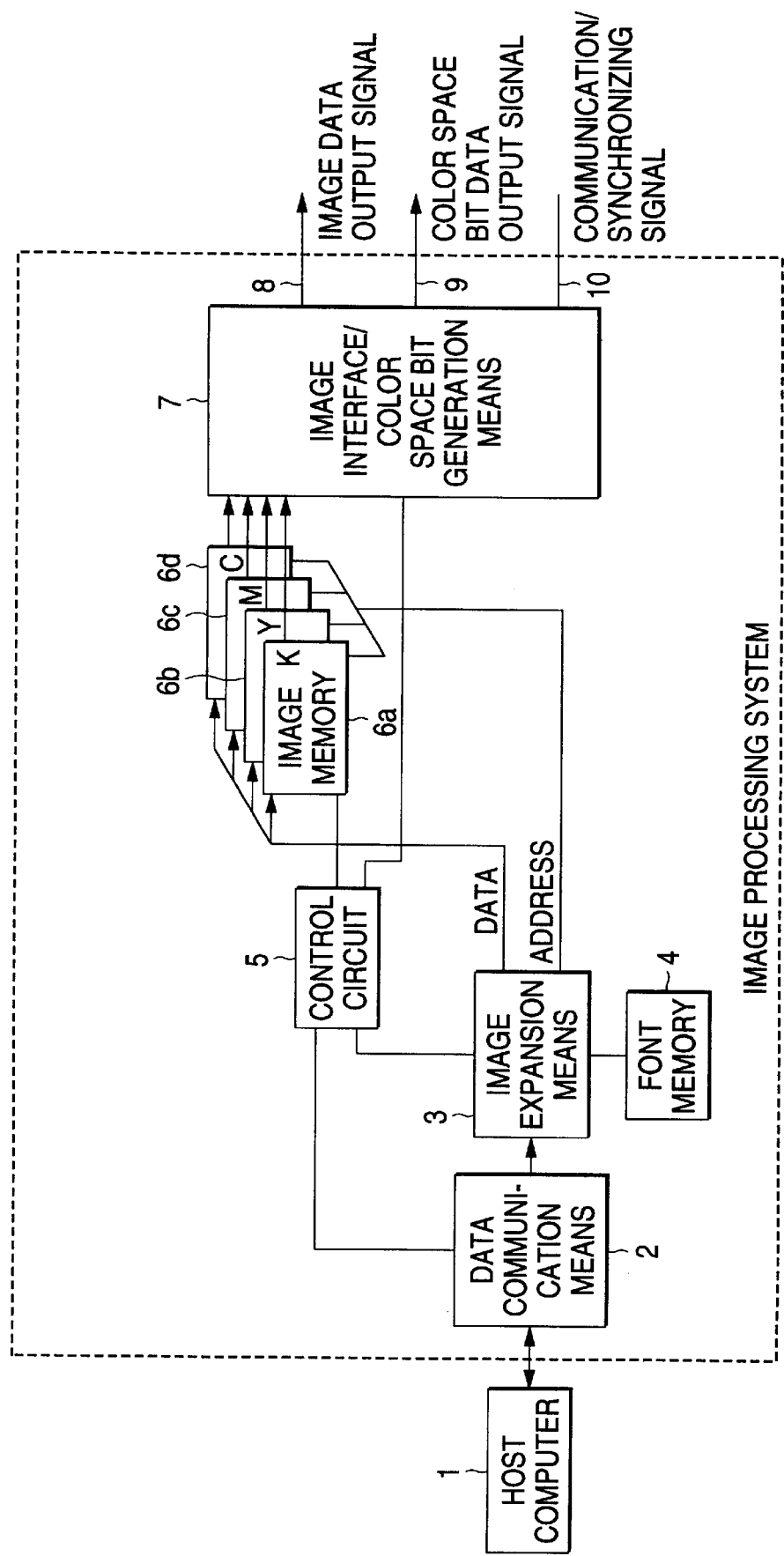
FIG. 1 is a block diagram of an image processing device according to a first embodiment of the invention.
Figure 2:
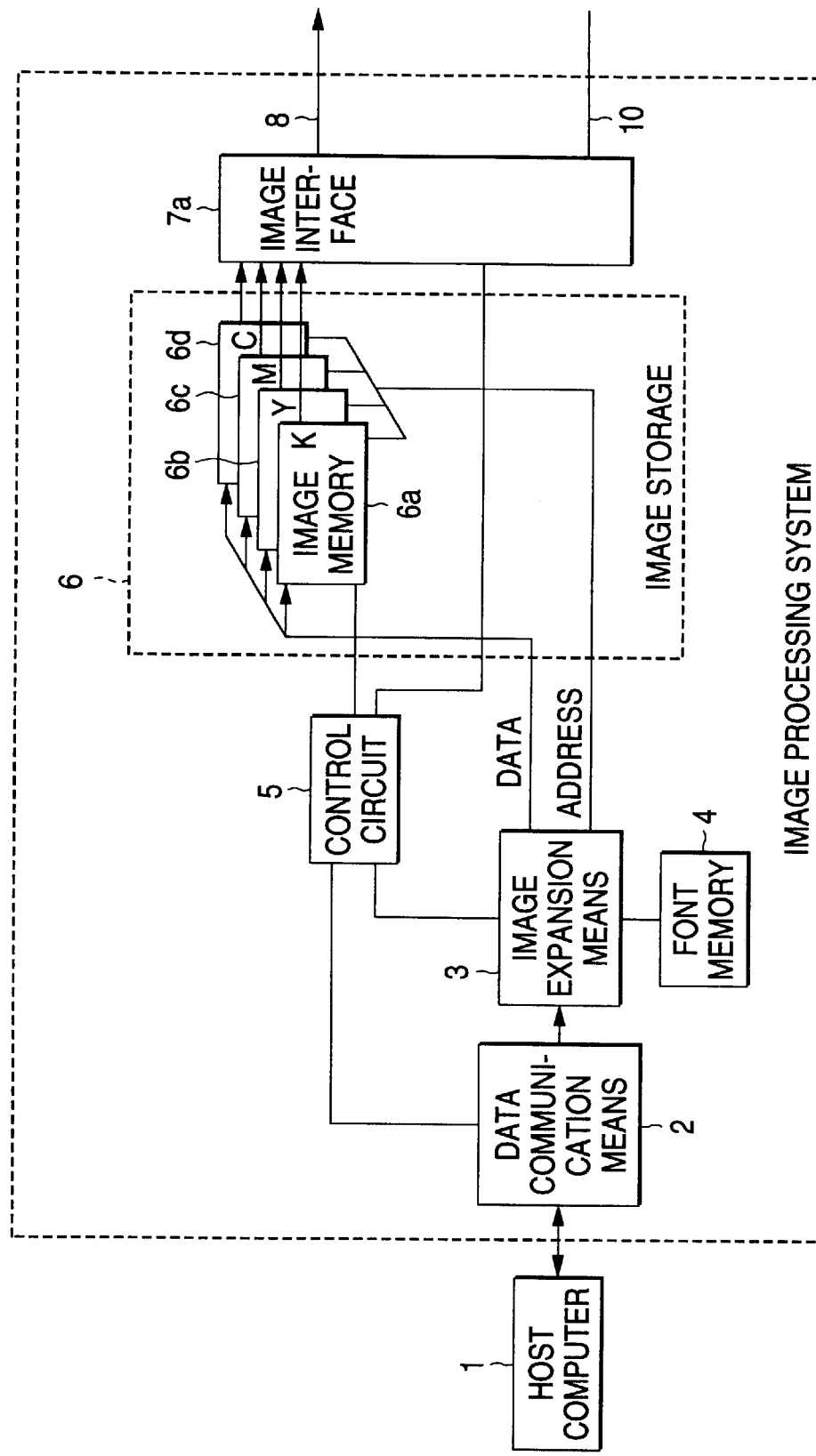
FIG. 2 is a block diagram of a conventional image processing device compared with the invention.

Embodiment 1:

FIG. 1 is a block diagram of an image processing device according to a first embodiment of the invention. A PDL file created by a host computer 1, such as PostScript (registered trademark) of Adobe or Interpress (registered trademark) of Xerox, Is received by data communication means 2 of the image processing device for input. The input PDL file is passed to image expansion means 3 for performing image expansion processing for the file. At the image expansion time, when font expansion is executed, data In a font memory 4 is referenced and font expansion processing is performed.

The image expansion means 3 of the image processing device of the first embodiment interprets the PDL file and creates an object list of the image elements. The object list is a structure indicating where the objects exist on the image coordinate space that the image processing device has, what composition the image elements are of, what color space attribute the image elements have, and what color the objects have. The position on the image coordinate space can be represented as (xmin, ymin), (xmax, ymax); the composition can be represented as a raster image, character, rectangle, circle, line, or any other image element; the color space attribute is represented by CIE-based tristimulue value XYZ, device KYMC, device RGB, etc.,; and the colors can be specified by using a color pallet contained in the image expansion means 3.

The image expansion means 3 expands and converts the image data as the object list resulting from the image expansion processing into a raster image.

Since the first embodiment assumes image memories 6a–6d, which are collectively called image memory 6, having full memories as image memory, after expansion and conversion, the resulting data is expanded and converted as a byte map rasterized for each page and is temporarily stored in K, Y, M, and C image memories 6a–6d. For full memory, in the image processing device which performs expansion processing in K, (black), Y (yellow), M (magenta), and C (cyan) color space, for example, the image memory 6 that can store an A3-size (297 mm ×420 mm) image with a resolution of 400 dpi (dote per inch) with each pixel consisting of eight bite has a capacity of 128 megabytes.

To perform expansion and conversion processing as the byte map rasterized from the object list, a check is made to see if an object exists for each scan line in the x direction from the smallest position in the image coordinate space (x=0, y=0). If an object exists, expansion and conversion processing is performed for the object and data required for the scan line in the x direction is calculated for providing necessary data.

Similar processing Is performed for all objects existing on the scan line, thereby providing a byte map for the scan line This scan line byte map is written into the image memory 6, then expansion processing is performed for another scan line.

When performing the expansion processing described above, the image processing device performs expansion and conversion processing for raster image elements other than the color space (here, device KYMC) of the image formation device intended by the image processing device as follows:

To perform expansion processing for raster image elements other than the color space (here, device KYXC) of the image formation device intended by the image processing device in expansion and conversion processing, the color space and presence position of each raster image element are recognized from the object list and a color space conversion image element list showing the presence of the image elements is created. The data is passed to a control circuit 5, which then holds the color space conversion image element list until image data is output.

When expansion processing is performed, conversion processing to the color space that the image processing device has is not performed for the image elements contained in the color space conversion image element list and expansion processing is performed for the image elements in the color space when they were tent with the PDL file. For the image elements having a 3-separation color space, expansion processing is performed on the Y, M, and C memories of the image memory 6 of the image processing device. For example, for device RGB or CIE XYZ, expansion processing is performed on the Y, M, and C memories of the image memory 6.

Thus, the expansion processing is performed for all scan lines for one page and the rasaterized image data is written into the image memory 6.

If image elements having different color space attributes overlap each other at the expansion processing time, the attribute of the image element at the top stage is applied Upon completion of the image data expansion processing to the image memory 6 by the image expansion means 3, image interface/color space bit generation means 7, simply image interface means 7, communicates with the target image formation device via a communication/synchronizing signal 10. The image formation device outputs an image output synchronizing signal to the image processing device via the communication/synchronizing signal 10. When receiving the image output synchronizing signal, the image interface means 7 of the image processing device issues an image data output instruction to the control circuit 5, and image data in the image memory 6 is output through the image interface means 7 to the image formation device. At the time, the control circuit 5 references the color space conversion image element list created at the image expansion processing time and when outputting image elements requiring color space conversion processing, instructs the image interface means 7 to generate color space bits indicating the color space conversion processing. Then, the image interface means 7 generates the color space bits at the same time as the image data output and outputs the bits by a color space bit output signal 9. The output image data and color space bits are sent to the image formation device by an image data output signal 8 and color space bit data output signal 9 of the image interface means 7. At the time, the image data and color space bits are sent in order for each scan line in the x direction from the smallest position in the image coordinate space of the image memory 6 (x=0, y=0). The image memory 6 in which the image data is stored and the image coordinate space of the color space conversion image element list held by the control circuit 5 have the same image coordinate space and the size of one plane is the same. The Image data and color space bits are output to the image formation device in the complete synchronization form for each identical coordinate data. In the image processing device, processing instructions are all given in the synchronization form by the control circuit 5.

Figure 3:
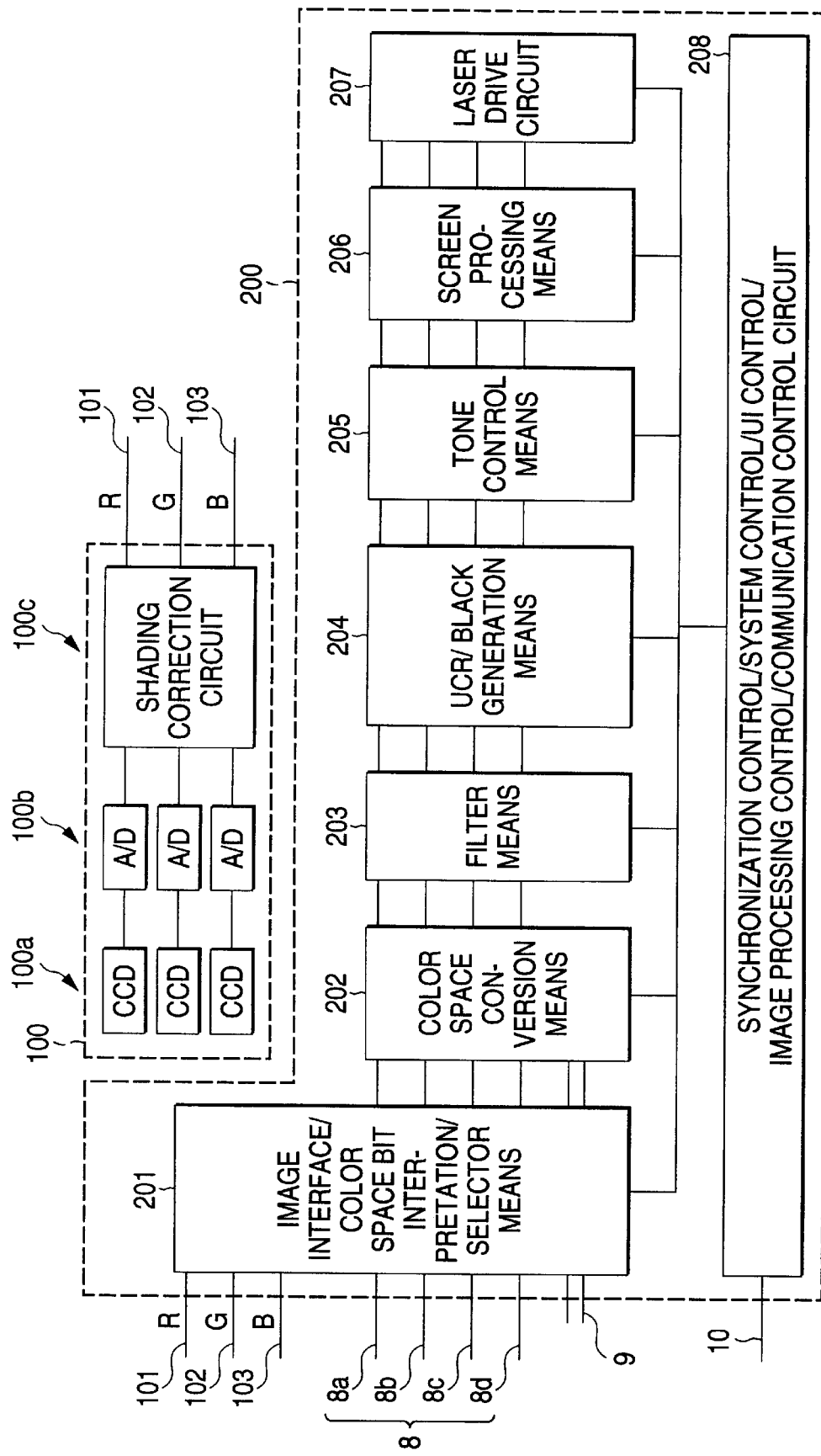
FIG. 3 is a block diagram of an image formation device comprising color space bit interpretation means, color space conversion processing means, and image processing means intended by the image processing device according to the first embodiment of the invention.

FIG. 3 shows an image formation section 200, which comprises image interface/color space bit Interpretation/selector means 201, color space conversion means 202, filter means 203, UCR (ground color removal)/black generation means 204, tone control means 205, screen processing means 206, laser drive circuit 207, and synchronization control/device control/UI (user interface) control/image processing control/communication control circuit 208.

As shown in FIG. 3, the image formation section 200 may be an image formation device of a copier type having an image input unit 100 comprising a CCD image sensor 100a, an A/D converter 100b, a shading correction circuit 100c, etc. In this case, the image data read and input through the image input unit 100 is sent to the image interface/color space bit interpretation/elector means 201 as R (red), G (green), B (blue) color space data by an image input unit red component output signal 101, an image input unit green component output signal 102, and an image input unit blue component output signal 103. The selector function of the means 201 is used to switch between the image data sent from the image processing device and the input image data from the image input unit 100 and image formation processing is performed. The image interface/color space bit interpretation/selector means 201 interprets the color space bits sent by the color space bit data output signal 9 at the same time as the image data sent by the image data output signal 8 from the image processing device and normally sends the bits intact as bit information to the color space conversion means 202 without performing conversion processing. In FIG. 3, 8a is a K (black) image data output signal, 8b is a Y (yellow) image data output signal, 8c is an M (magenta) image data output signal, and 8d is a C (cyan) image data output signal.

At the image formation time, the color space conversion means 202 performs different color space conversion processing as pipeline processing in response to specification of the color space bits.

Figures 4, 5:
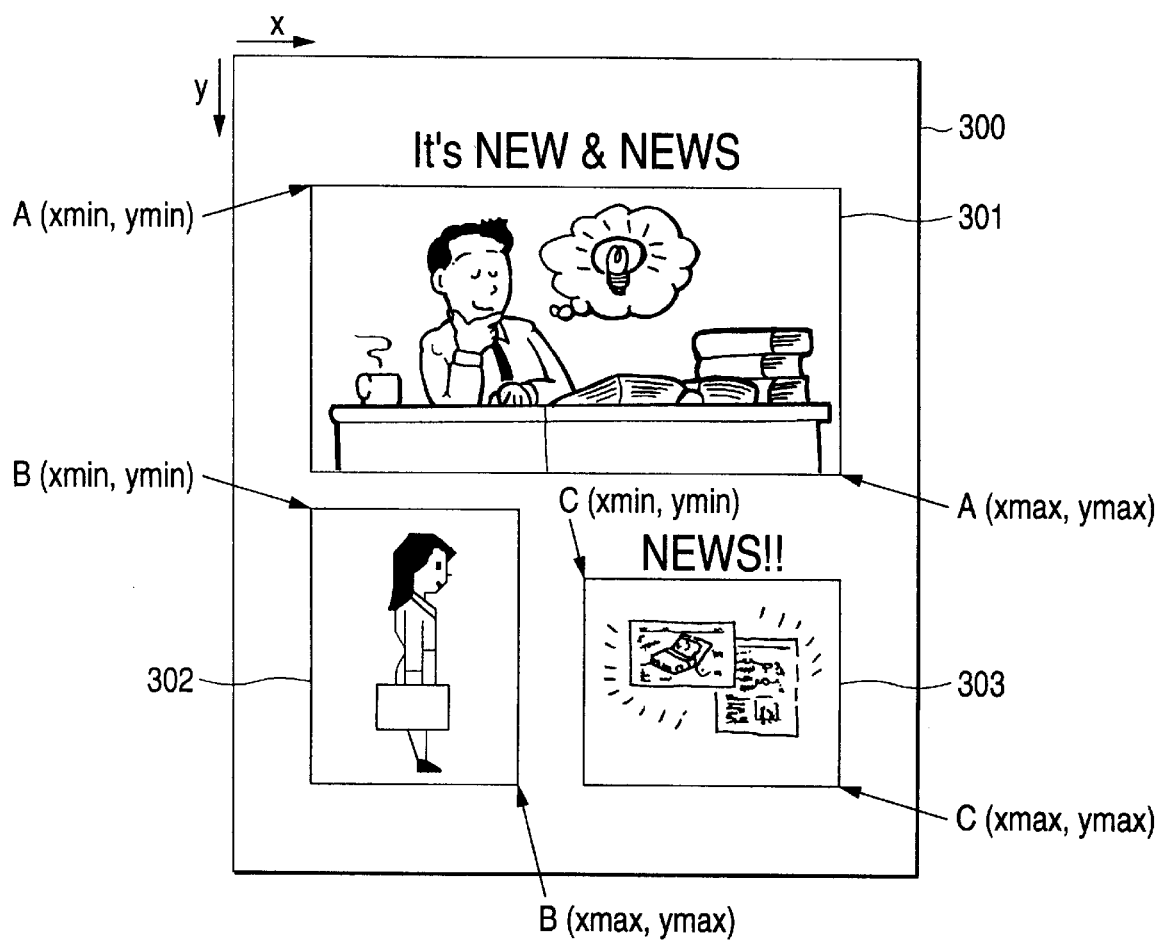
FIG. 4 is an illustration showing a color space conversion function table of color space bits contained in the image processing device according to the first embodiment of the invention.
FIG. 5 is an illustration showing a document having image elements different in color space on one page to be processed by the image processing device according to the first embodiment of the invention.

FIG. 4 is an illustration showing a color space conversion function table of color space bits contained in the image processing device according to the first embodiment of the invention.

As shown in FIG. 4, the image processing device has two color space bits (1:0) and the color space conversion functions indicated by the color space bits are as follows:
  Device KYMC to device KYMC conversion (0)
  CIE XYZ to device XYMC conversion (1)
  device YMC to device KYMC conversion (2)
  device RGB to device KYMC conversion (3)
The color space conversion means 202 performs color space conversion processing in accordance with the function specification of the color space bits.

The synchronization control/device control/UI control/image processing control/communication control circuit 208 performs synchronization control/device control/UI control/image processing control/communication control in the image formation device and also gives an instruction as to the color space conversion processing to be performed in response to the setting of the color space bits by software before the operation is started.

The image formation device may adopt any of electrophotographic, ink jet, and thermal transfer devices.

FIG. 5 shows classification of the attributes of image elements having different color spaces in the first embodiment. In the image processing device of the first embodiment, an original image 300 is classified into a device RGB data image element 301, a device YMC data image element 302, and CIE XYZ data image element 303. When each image element is output, color space bits required for the data are generated and appropriate color space conversion processing is performed for each image element in response to the setting of the color space bits.

In the first embodiment, when the device RGB data image element 301 is output, the color space bits for device RGB to device RYXC conversion (3) are generated for performing device RGB to device KYMC conversion processing. When the device YMC data image element 302 is output, the color space bits for device YMC to device KYMC conversion (2) are generated for performing device YMC to device KYMC conversion processing. When the CIE XYZ data image element 303 is output, the color space bits for CIE XYZ to device KYMC conversion (1) are generated for performing CIE XYZ to device KYMC conversion processing. For other areas, the color space bits for device KYMC to device KYXC conversion (0) are generated for performing device KYMC to device KYMC conversion (through) processing.

Figure 6:
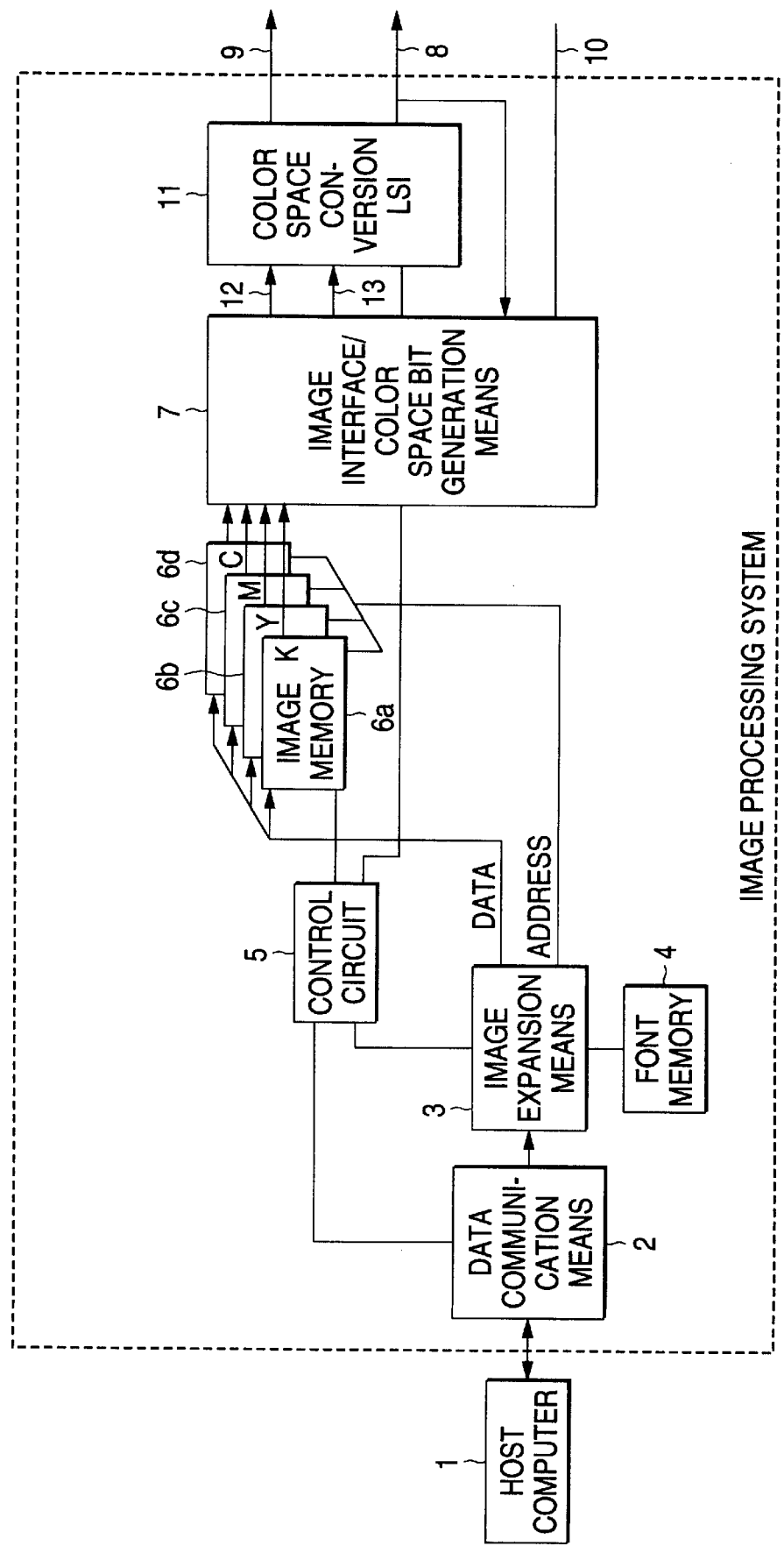
FIG. 6 is a block diagram of an image processing is device according to a second embodiment of the invention.

Embodiment 2:

FIG. 6 is a block diagram of an image processing device according to a second embodiment of the invention Circuit parts identical with or similar to those previously described in the first embodiment are denoted by the same reference numerals in FIG. 6. In the second embodiment, an image data output signal 8 and a color space tag bit data output signal 9 of image interface/color space bit generation means 7 are connected to a color space conversion LSI 11 with a general-purpose DLUT (direct look-up table) in a similar configuration to that of the first embodiment.

According to the second embodiment, as in the first embodiment, image expansion and generation processing is performed while the attributes of image elements input through different image input units are held; here, color space conversion processing and color matching processing normally performed at the image expansion time are not performed.

Then, as in the first embodiment, an image data output signal 8 and color space tag bit signal 9 are output and input to the color space conversion LSI 11. Image data is input as an image input signal of the color space conversion LSI 11 and color space tag bits are input an a color space conversion LSI (look-up table) switch signal. The color space conversion LSI 11 contains color space conversion LUTs for four devices. The color space conversion LUT referenced internally in color space conversion is switched at real time in response to specification of the color space conversion LUT switch signal and different color space conversion processing and color matching processing are performed for each image element.

Figures 7, 8:
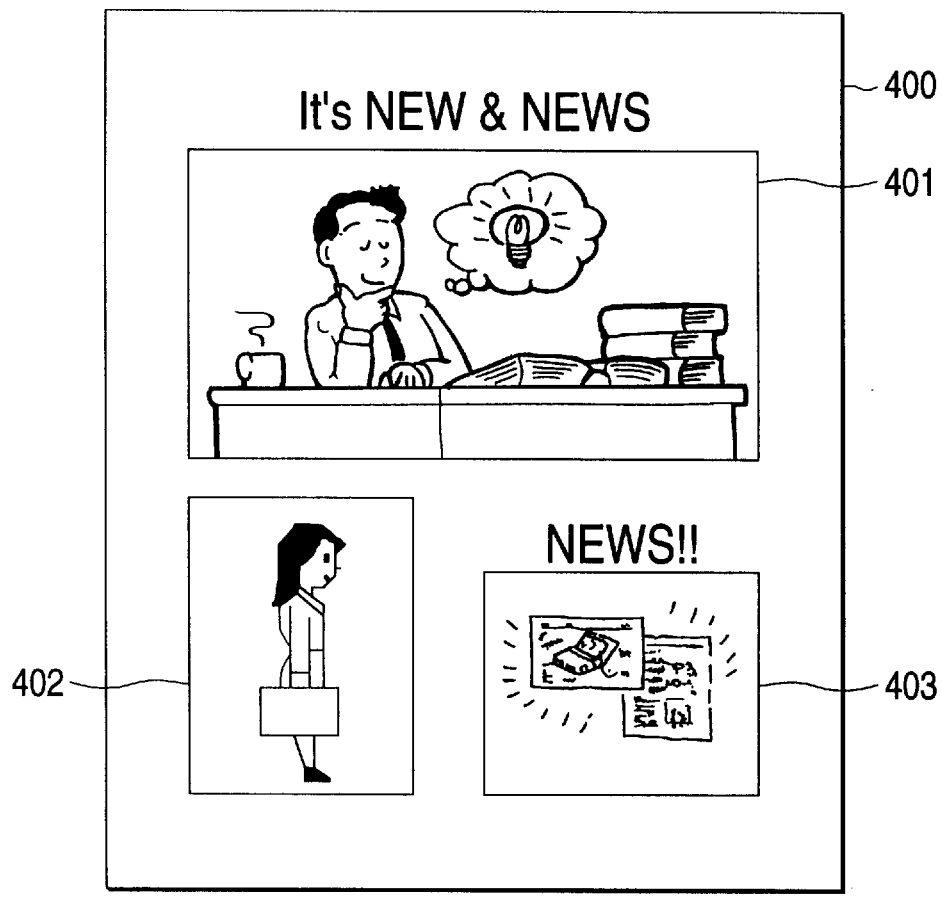
FIG. 7 is an illustration showing a color matching function table contained in the image processing device according to the second embodiment of the invention.
FIG. 8 is an illustration showing a document having image elements different in color matching processing performed on one page to be processed by the image processing device according to the second embodiment of the invention.

FIG. 7 shows a color matching function table according to the second embodiment of the invention. In the second embodiment, the color space tag bits are used as a color space conversion LUT switch signal for hardware color matching LSI indicating the operation as listed in the color function table in FIG. 7. Since color space conversion and color matching processing are performed in the image processing device in the second embodiment, in response to the specification of the color space tag bits sent to an image formation device, the image formation device does not perform color space conversion processing and performs any other image processing, such as tone correction.

FIG. 8 is an illustration showing a document having image elements different in color matching processing performed on one page to be processed by the image processing device according to the second embodiment of the invention. According to the second embodiment, when image elements different in color matching processing performed are contained on one page as shown in FIG. 8, different color matching processing for each image element can also be performed at high speed by a method such as DLUT; real-time processing can be performed at the image output time. A color matching output image 400 shown in FIG. 8 shows a document containing image elements input through three different image input units A, B, and C. It comprises an image element 401 from A image-input unit, an image element 402 from B image input unit, and an image element 403 from C image input unit. The second embodiment also provides a conversion function to device values handled in the image processing device and a high-speed color space conversion processing function to device values handled in other computers as well as color space conversion processing at the image output time in the image processing device in a similar configuration.

Figure 9:
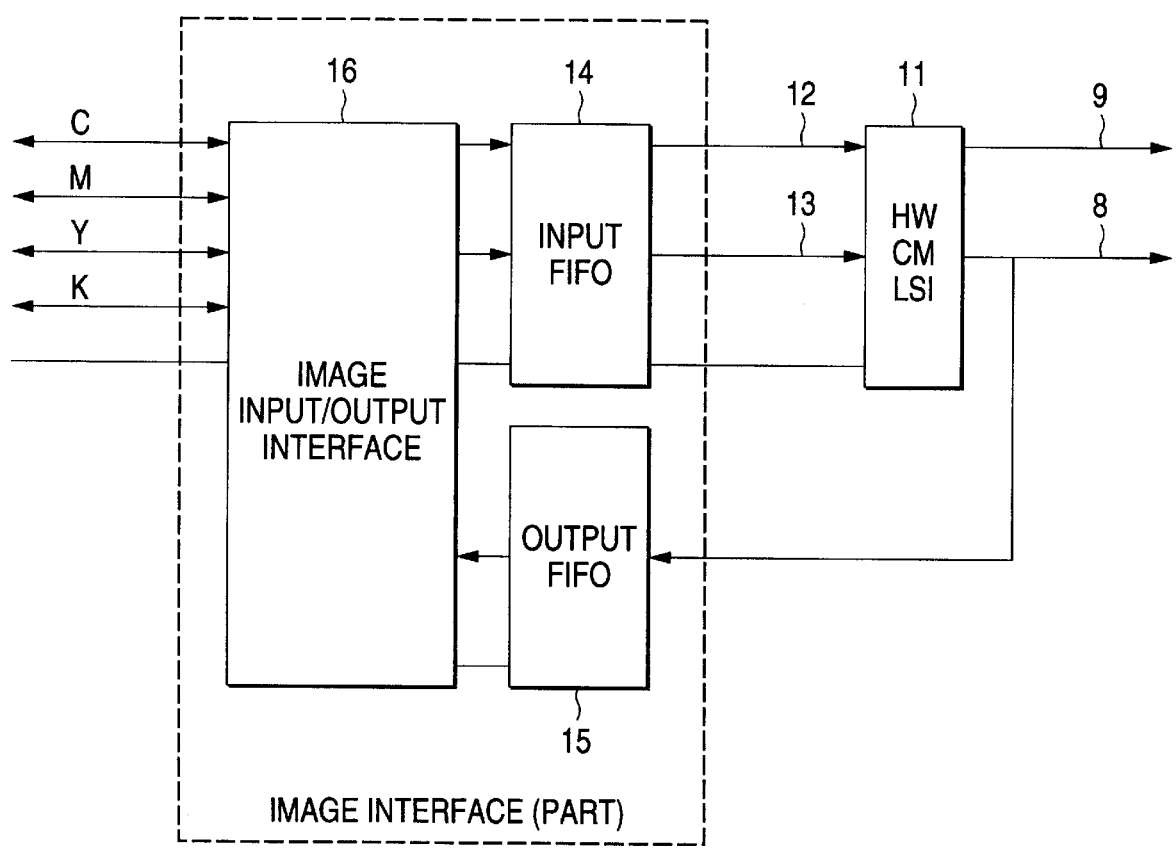
FIG. 9 is a block diagram showing a high-speed color space conversion processing device according to the second embodiment of the invention.

FIG. 9 is a block diagram showing a high-speed color space conversion processing device according to the second embodiment of the invention, wherein only the portion related to the high-speed color space conversion processing device is extracted from the image interface/color space bit generation means 7 and the color space conversion LSI 11. The processing device is used to provide the conversion function to device values handled in the image processing device and the high-speed color space conversion processing function to device values handled in other computers (acceleration) as well as color space conversion processing at the image output time in the image processing device in a similar configuration.

The high-speed color space conversion processing device comprises an image input/output interface 16 having a selector function for switching C, M, Y, and K color image input data sources and a high-speed DMA function that can input/output image data from color image memories 6a–6d at high speed. The image data is input from each color image memory 6a–6d at high speed by DMA transfer and is temporarily stored in a color space conversion data input FIFO 14. When the input data for which color space conversion is to be performed is stored in the color space conversion data input FIFO 14, automatically the color space conversion LSI 11 fetches the data and performs color space conversion processing for the data. After the color space conversion, the resulting data is stored in a color space conversion data output FIFO 15. When output data after the conversion in stored in the color space conversion data output FIFO 15, the image input/output interface 16 restores the data after the color space conversion in the color image memories 6a–6d automatically at high speed by DMA transfer.

Normally, in such color space conversion processing, the input image data source takes a 3-element composition, such as RGB, YMC, or l*a*b*, and the output image data after the conversion takes a 3- or 4-element composition. As described above, the color space conversion LSI 11 contains LUTs required for color space conversion and the LUT required for color space conversion can be selected for each color space conversion pixel in response to input indication of a color space bit data output signal 13 for color matching. When the input image data source is 3-element input, color space bit data indicating that the LUT should be switched for each image element is prepared in the K (black) image memory 6a, and is fed into the color space conversion LSI 11 at the same time as input image data of other three elements, whereby different color space conversion processing can be performed at high speed in image element units or in any desired pixel units.

Figure 10:
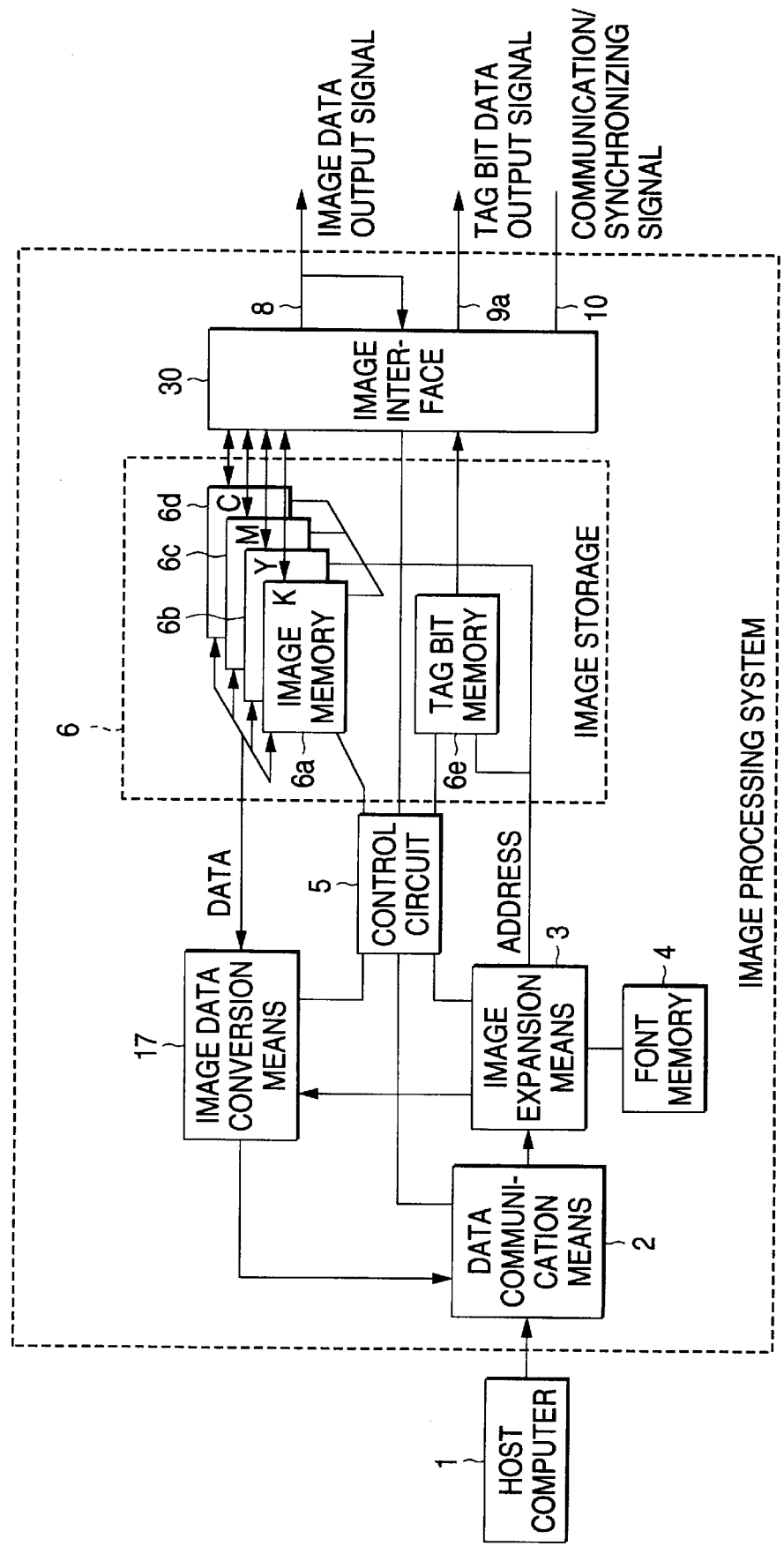
FIG. 10 is a block diagram of an image processing device according to a third embodiment of the invention.

Embodiment 3:

FIG. 10 is a block diagram of an image processing device according to a third embodiment of the invention. Circuit parts identical with or similar to those previously described in the first and second embodiments are denoted by the same reference numerals in FIG. 10.

Although attention is focused on color spaces of images for processing in the first and second embodiments, attention is focused on space resolution and tone resolution of images in the third and later embodiments.

In the third embodiment, image interface means 30 for generating object tag bits indicating the nature of an image is provided in place of the image interface means 7 for generating the color space bite in the first embodiment. Also, image data conversion means 17 for generating object tags is provided.

A PDL file created by a host computer 1 is received by data communication means 2 for input. The input PDL file is passed to image expansion means 3 for performing image expansion processing for the file. At the image expansion time, when font expansion is executed, data in a font memory 4 is referenced and font expansion processing is performed.

The image expansion means 3 interprets the PDL file and creates an object list of the image elements. The structure of the object list is the same as that in the first embodiment except that attribute information indicating the image nature is contained in place of the color space attribute information. The attributes indicating the image nature are represented by characters, line image, contone image that means continuous tone image, graphics elements, etc., for example.

The image data as the object list resulting from the image expansion processing is passed to the image expansion means 17, which then expands or converts it into various pieces of data.

After the conversion, the resulting data is expanded and converted as a byte map rasterized for each page and to temporarily stored in X, Y, M, and C image memories 6a–6d.

To perform expansion and conversion processing an the byte map rasterized from the object list, expansion processing is performed for all scan lines of one page and the rasterized image data is written into image memory 6 as in the first embodiment.

In addition to the expansion processing, the image data conversion means 17 generates object tag bits. The presence positions of objects different in attributes and the attributed of the objects (image elements) can be explicitly judged from the object list passed to the image data conversion means 17 as described above. Based on the information, the image data conversion means 17 performs tag bit generation processing for a tag bit memory 6e.

FIG. 11 shows a tag bit function table according to the third embodiment. As seen in the figure, the tag bit memory 6e contained in the image processing device of the embodiment is a memory having a capacity of two tag bits (1:0) ×4 mega pixels (8 megabits) and is used for classification into four types of image elements. Image element areas are classified into a contone image area (3), a graphics area (2), a character/line image area (1), and a miscellaneous area (0). To generate tag bits, while performing image data expansion and conversion processing, the image data conversion means 17 knows the characteristics and presence positions of the image elements and writes the tag bits into the tag bit memory 6e as listed in the tag bit function table in FIG. 11.

If image elements having different attributes overlap each other at the expansion processing time, the attribute of the image element at the top stage is applied.

Upon completion of the image data expansion processing to the image memory 6 and the tag bit generation processing into the tag bit memory 6e by the image expansion means 17, the image interface means 30 communicates with a target image formation device via a communication/synchronizing signal 10. The image formation device outputs an image output synchronizing signal to the image processing device via the communication/synchronizing signal 10. When receiving the image output synchronizing signal, the image interface means 30 of the image processing device issues an image data output instruction to a control circuit 5, and the image data in the image memory 6 and the tag bits in the tag bit memory 6e are output through the image interface means 30 to the image formation device. At the time, the image data and the tag bits are sent to the image formation device by an image data output signal 8 and a tag bit data output signal 9a of the image interface means 30.

At this time, the image data and tag bite are sent in order for each scan line in the x direction from the smallest position in the image coordinate space of the image memory 6 (x=0) (y=0). The image memory 6 in which the image data is stored and the tag bit memory 6e in which the tag bits are stored have the same image coordinate space and the size of one plane is the same. The image data and tag bits are output to the image formation device in the complete synchronization form for each identical coordinate data. In the image processing device, processing instructions are given in the synchronization form by the control circuit 5.

Figure 12:
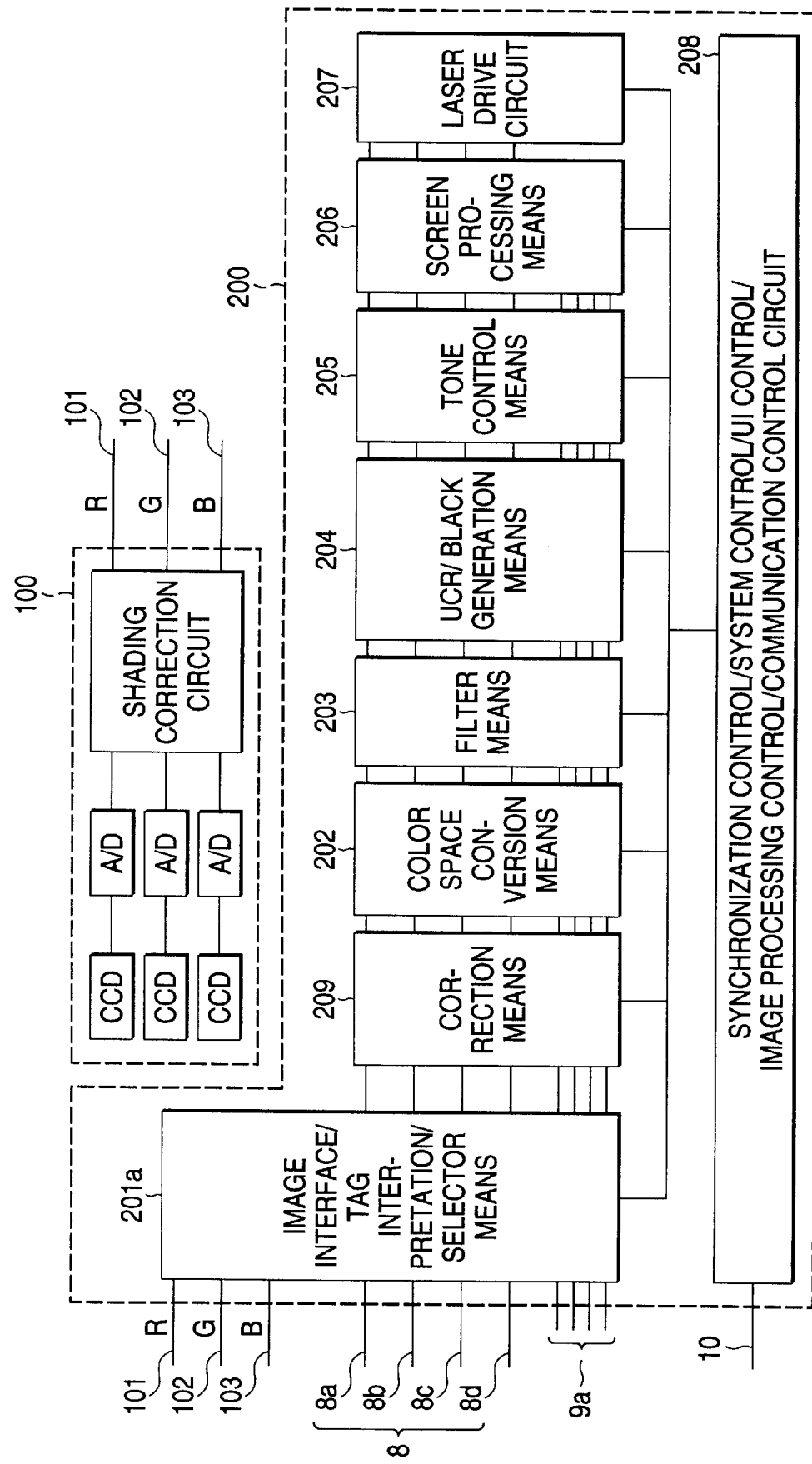
FIG. 12 is a block diagram of an image formation device comprising tag bit interpretation means and various image processing means intended by the image processing device according to the third embodiment of the invention.

FIG. 12 shows an image formation section 200 of the image formation device intended by the image processing device. This image formation section 200 shown in FIG. 12 has the same configuration as the image formation section 200 shown in FIG. 3 except that image interface/tag interpretation/selector means 201a is provided in place of the image interface/color space bit interpretation/selector means 201 and that γ correction means 209 is newly provided.

The image Interface/tag interpretation/selector means 201a shown in FIG. 12 Interprets the tag bits sent by the tag bit data output signal 9a at the same time as the image data sent by the image data output signal 8 in the image processing device and normally sends the bits intact as bit information to processing means of image processing means without performing conversion processing.

The image processing means of the γ correction means 209, color space conversion means 202, filter means 203, UCR (ground color removal)/black generation means 204, tone control means 205, and screen processing means 206 have each an image processing function for performing different image processing and an LUT (look-up table) for performing for performing different image processing in response to specification of the tag bits, and perform image processing for the image data sent from the image processing device as pipeline processing according to the specification of the tag bits.

Processing of the screen processing means 206 will be discussed as an image processing example. The green processing means 206 is screen processing means having two types of screens (200-line and 400-line screens). Since the tag bits sent from the Image processing device have any value of 3 (contone image area), 2 (graphics area), 1 (character/line image area), and 0 (miscellaneous area), processing is performed so as to output with 400 lines for the character/line image area (1) and output with 200 lines for the miscellaneous area, and the output in sent to a laser drive circuit 207 for image formation.

Likewise, the γ correction means 209 performs γ correction coefficient switching, the color space conversion means 202 performs LUT switching at the color space conversion processing time, the filter means 203 performs filter coefficient switching at the filtering time, the UCR/black generation means 204 performs coefficient switching at the UCR/black generation time, and the tone control means 205 performs tone control LUT switching at the tone control time.

Synchronization control/device control/UI control/image processing control/communication control circuit 208 performs synchronization control/device control/UI control/image processing control/communication control in the image formation device and also gives an instruction as to the image processing to be performed In response to the setting of the tag bits by software before the operation is started.

Figure 13:
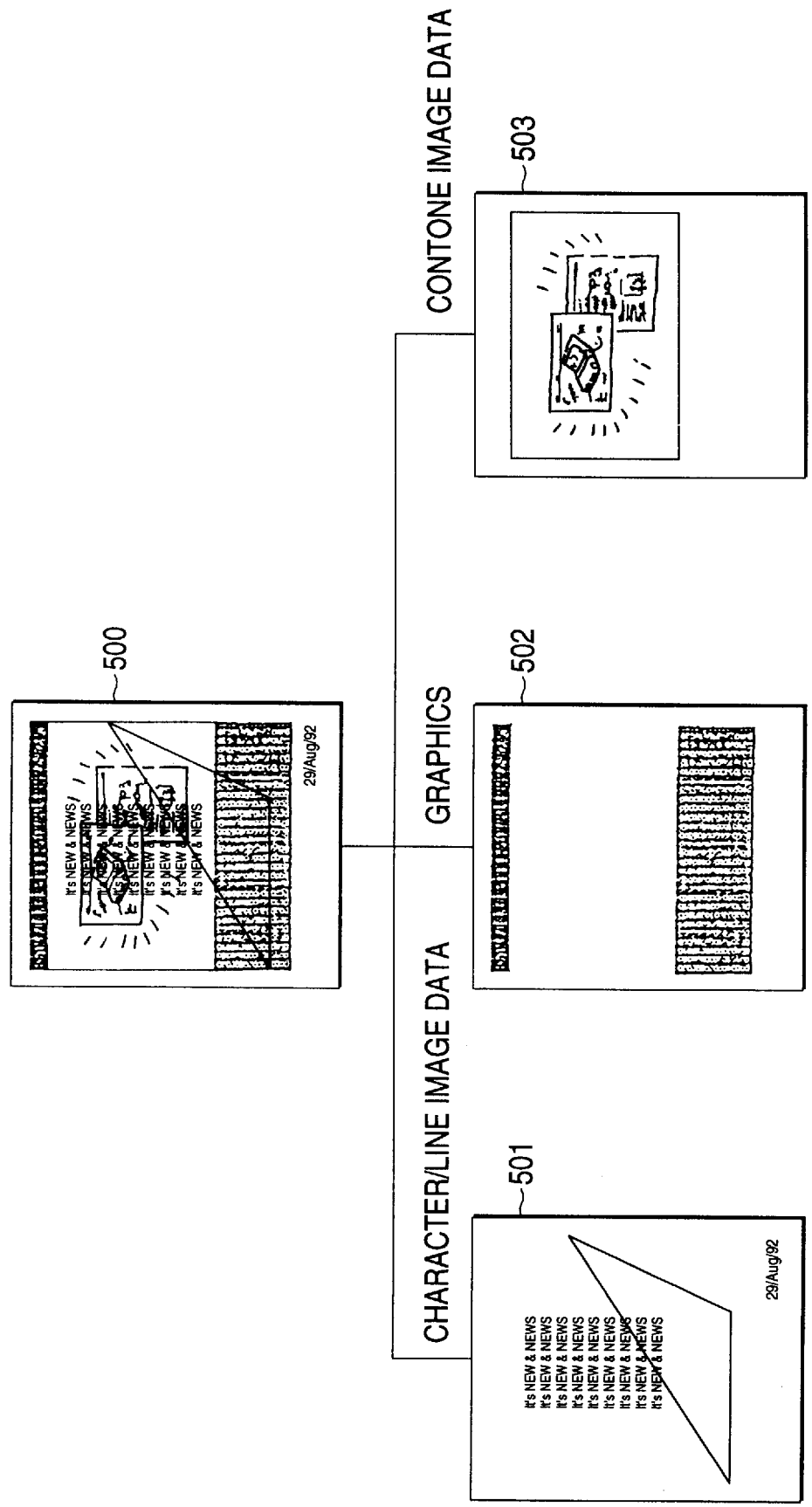
FIG. 13 is an illustration showing the division concept of image elements of a document (one page) according to the third embodiment of the invention.

FIG. 13 shows classification of the attributes of image data in the third embodiment. In the image processing device of the third embodiment, an original image 500 is classified into a character/line image element extraction image 501, a graphics element extraction image 502, and contone image area element extraction image 503, and tag bit generation processing is performed.

Figure 14:
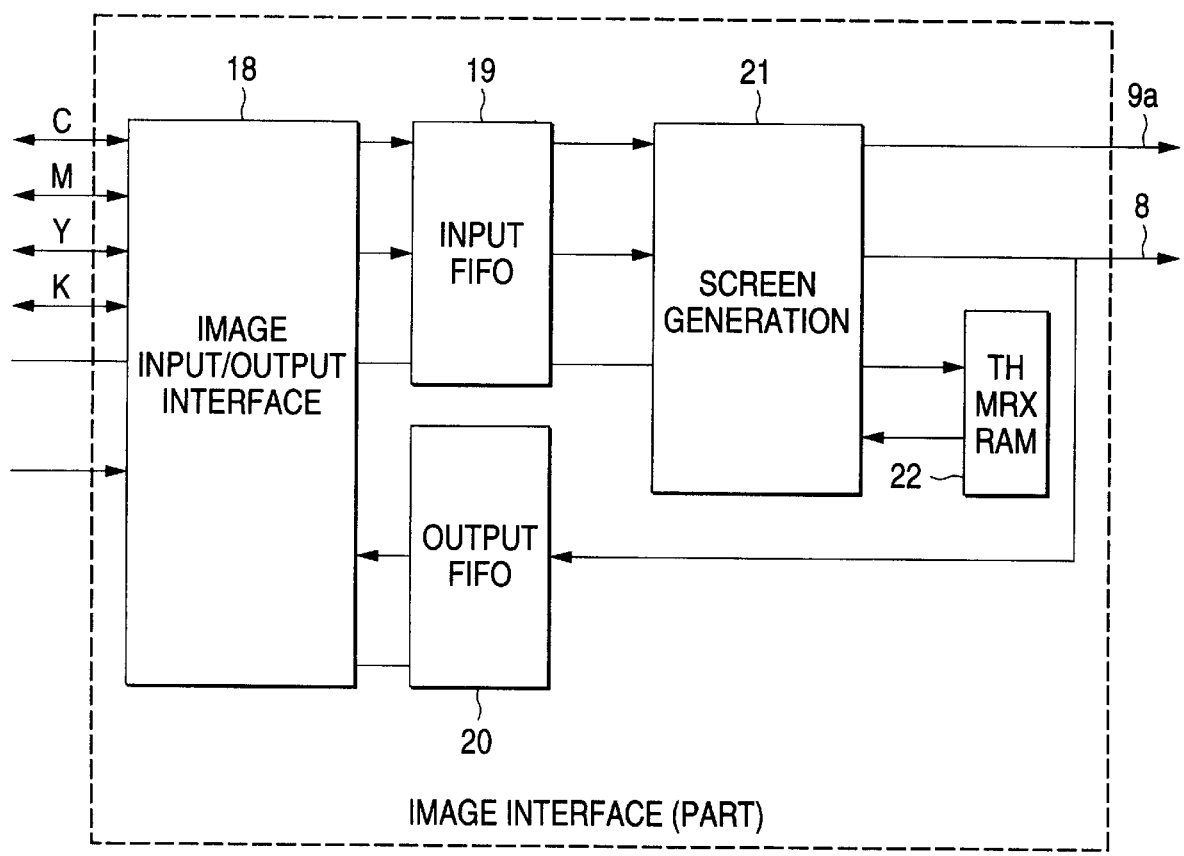
FIG. 14 is a block diagram of high-speed screen generation means according to the third embodiment of the invention.

FIG. 14 is a block diagram showing high-speed screen generation means according to the third embodiment of the invention, wherein only the portion related to the high-speed screen generation processing device is extracted from the image interface means 30 in the image processing device in FIG. 10. The generation processing device can be used to perform screen generation and conversion processing at high speed for input images read through various image input and edit units of a host computer, etc., as well as object tag generation at the image output time in the image processing device. The high-speed screen generation processing device comprises an image input/output interface 18 having a selector function for switching C, M, Y, and K color image input data sources and a high-speed DMA function that can input/output image data from color image memories 6a–6d at high speed. The image data is input from each color image memory 6a–6d at high speed by DMA transfer and is temporarily stored in a screen conversion data input FIFO 19. If the input data for which screen generation/conversion is to be performed is stored in the screen conversion data input FIFO 19 automatically a screen generation LSI 21 fetches the data and performs screen generation/conversion processing for the data. After the screen generation/conversion, the resulting data is stored in a screen conversion data output FIFO 20. If output data after the screen generation/conversion is stored in the screen conversion data output FIFO 20, the image input/output interface 18 restores the data after the screen generation/conversion in the color image memories 6a–6d automatically at high speed by DMA transfer. Different screen generation/conversion processing can be performed for each component image element by using the object tag bits generated in the image processing device.

Figure 15:
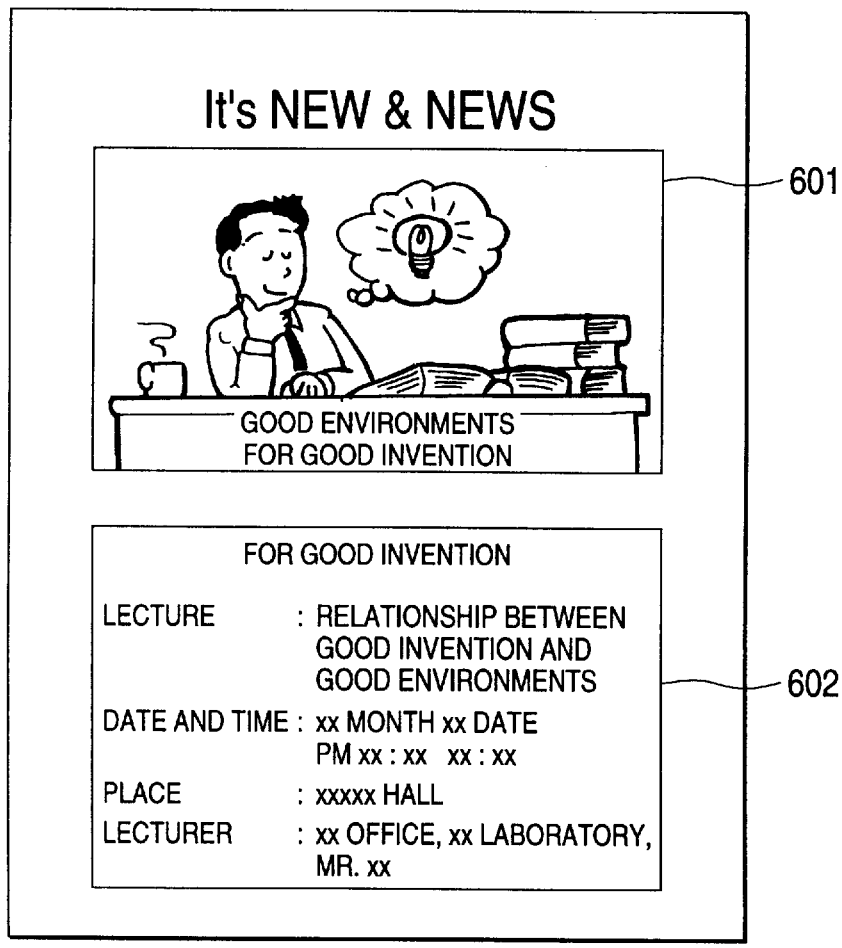
FIG. 15 is a conceptual drawing of image elements of a document according to the third embodiment of the invention.

FIG. 15 is a conceptual drawing of image elements of a document according to the third embodiment of the invention.

For example, when a screen is switched for each image element on a single type of screen, such as 200/400-line screen, in the image formation device in the third embodiment of the invention, image tone, such as missing white, may occur on the switch boundary. In such a case, as shown in FIG. 15, when an image element of characters, etc., requiring a high space resolution exists in a photo or half-tone image element area, the image processing device performs image generation on an image screen where no image tone occurs, for example, an area tone method such as mesh or error diffusion method for the image element existing below the area and the image formation device does not perform any processing for the lower area and performs image screen generation processing only for the character image element, whereby Image tone occurring on the screen switch boundary can be prevented. In FIG. 15, numeral 601 indicates a photo image area on which characters are superposed by performing image generation by error diffusion screen and numeral 602 indicates an area on which characters are superposed by performing image generation by mesh screen. In implementation of the embodiment, low-noise screens where image tone does not occur or image screens different in image screen angle are generated in a host computer 1 and the generated image screens are read into a threshold matrix RAM 22 connected to the half-tone generation LSI 21 via data communication means 2 of the image processing device, whereby any desired image screen generation/conversion can also be specified.

At the screen generation/conversion time of the half-tone generation LSI 21, first, various pieces of threshold matrix data are input to the threshold matrix RAM 22. For the threshold matrix data, if the screen generation means is a mesh, a mesh tone pattern is input; if it is dither, etc., a dither threshold pattern of 4×8, etc., indicating the threshold is input, and threshold in multivalued error diffusion of error diffusion, etc., is input. For a low-noise screen, etc., by any other proper area tone method, a tone pattern is input. For input data, the threshold matrix data in the threshold matrix RAM 22 is referenced at high speed for each input matrix data and screen generation/conversion processing is performed at high speed.

Embodiment 4:

FIG. 16 is an illustration showing a tag bit function table contained in an image processing device according to a fourth embodiment of the invention.

In the fourth embodiment, in a device of a similar configuration to that of the image formation device 200 for the image processing device of the third embodiment, a tag memory is made of a memory having a capacity of three tag bits (2:0) ×4 mega pixels (12 megabits) for covering image element classification like a color tone (contone image) area (7), monochrome tone (contone image) area (6), background color area (5), foreground color area (4), half-tone character area (3), color character area (2), black character area (1), and miscellaneous area (0) as shown in FIG. 16.

The operation of other processing means of the image processing device and that of a target image formation device in the fourth embodiment are similar to those in the third embodiment; the image processing device of the fourth embodiment differs from that of the third embodiment in covered image element classification.

Figure 17:
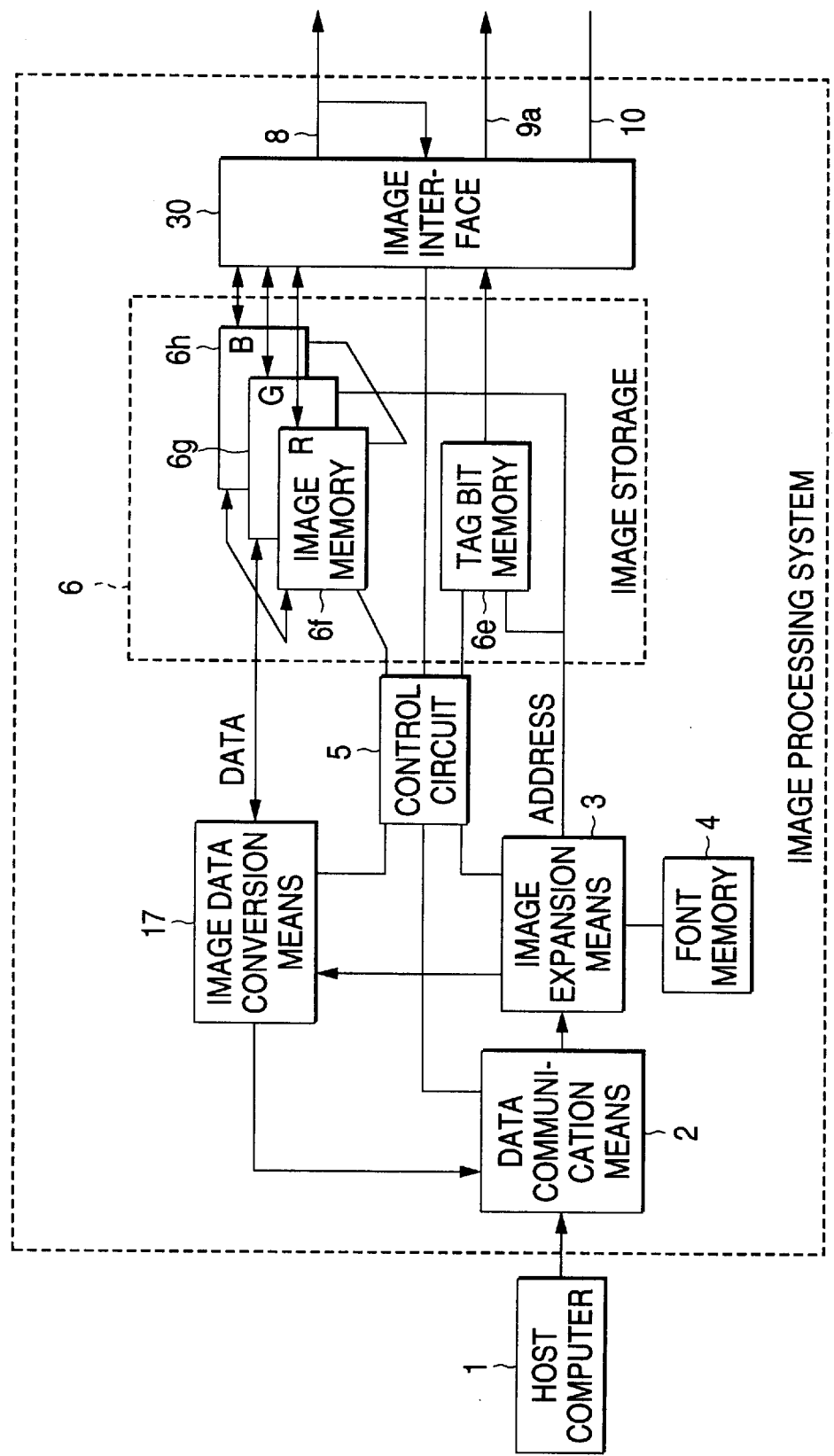
FIG. 17 is a block diagram of an image processing device according to a fifth embodiment of the invention.

Fifth embodiment:

FIG. 17 is a block diagram of an image processing device according to a fifth embodiment of the invention. Blocks Identical with those previously described with reference to FIG. 10 are denoted by the same reference numerals in FIG. 17.

Shown in the fifth embodiment of the invention is an image processing device having an image memory compatible with multivalued image output having R, G, B color space in a device of a similar configuration to that of the image formation device 200 for the image processing device of the third embodiment.

Shown in the fifth embodiment is the image processing device which has 96-megabyte image memory 6f, 6g, 6h that can store an A3-size (297 mm×420 mm) image with a resolution of 400 dpi with each pixel consisting of eight bits, compatible with output of image data having the R, G, B color space and has a similar function to that of the third embodiment, compatible with R, G, B multivalued image output.

Figure 18:
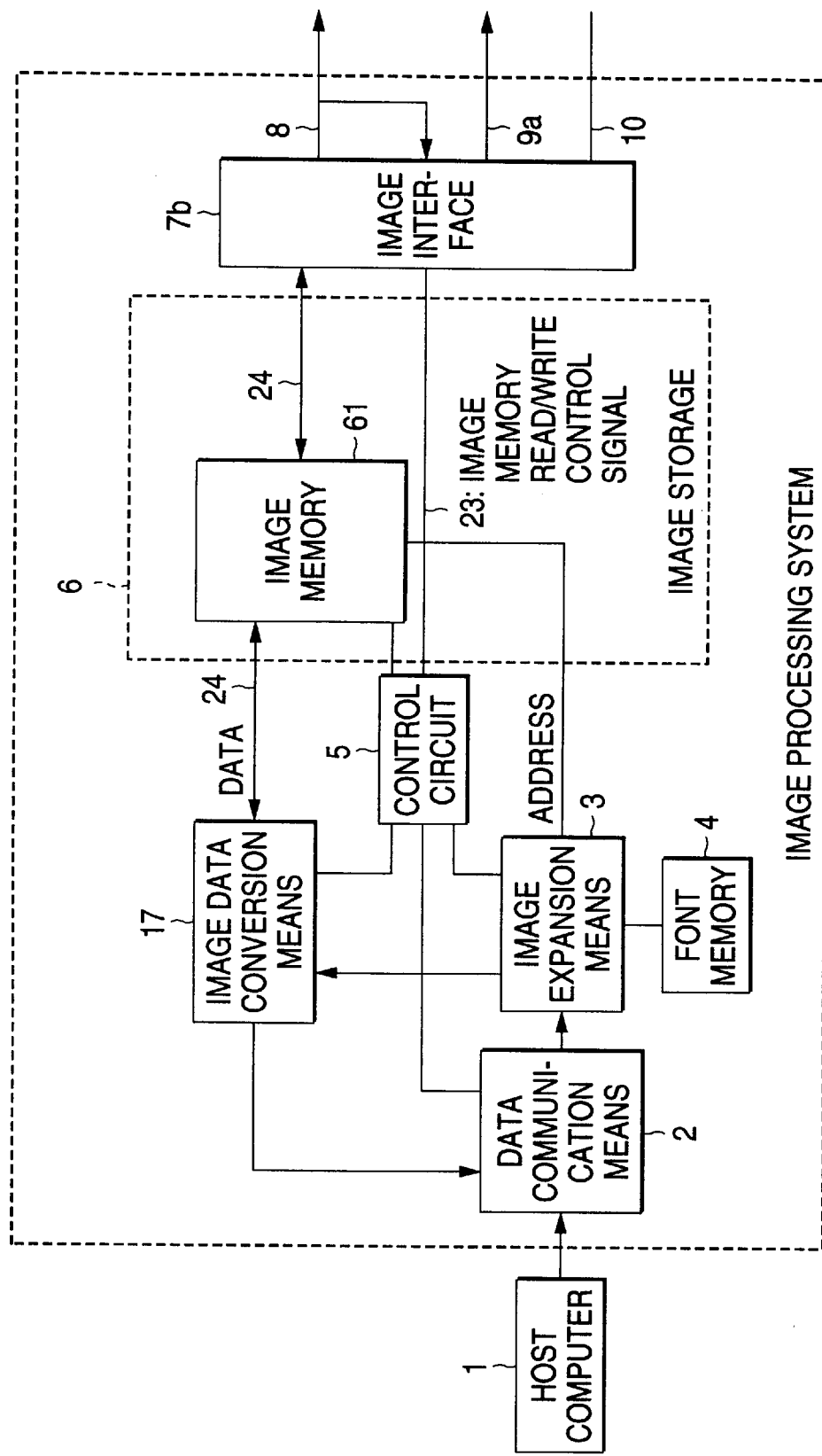
FIG. 18 is a block diagram of an image processing device according to a sixth embodiment of the invention.

Sixth embodiment:

FIG. 18 is a block diagram of an image processing device according to a sixth embodiment of the invention. Blocks identical with those previously described with reference to FIG. 10 are denoted by the same reference numerals in FIG. 18.

In the sixth embodiment, a 1-page image memory 6i is not provided with a continuous image memory space of a capacity required for the memory and has a virtual memory space smaller than that memory space and when an image is expanded in the image memory, a binarization coding device, a run length coding device, and a JPEG coding device area used for a character/line image area, a graphics area, and a contone image area respectively.

In the sixth embodiment, as in the third embodiment, image data conversion means 17 interprets image elements from an object list created by image expansion means 3 and classifies them into attributes. Here, they are classified into a character/line image area, a graphics area, and a contone image area from the object list an in the third embodiment. The image data conversion means 17 performs optimum coding conversion processing for each of the image elements by software or hardware. The image data in an intermediate format generated by performing conversion coding processing is stored in the image memory 6i of image storage means 6. In addition to the processing, the image data conversion means 17 also generates function data used to decode the image data in the intermediate format and combine into a raster image and stores the function data in the image memory 6i of the image storage means 6. In FIG. 18, numeral 23 is a image memory read/write control signal and numeral 24 is an image memory input data signal.

Figure 19:
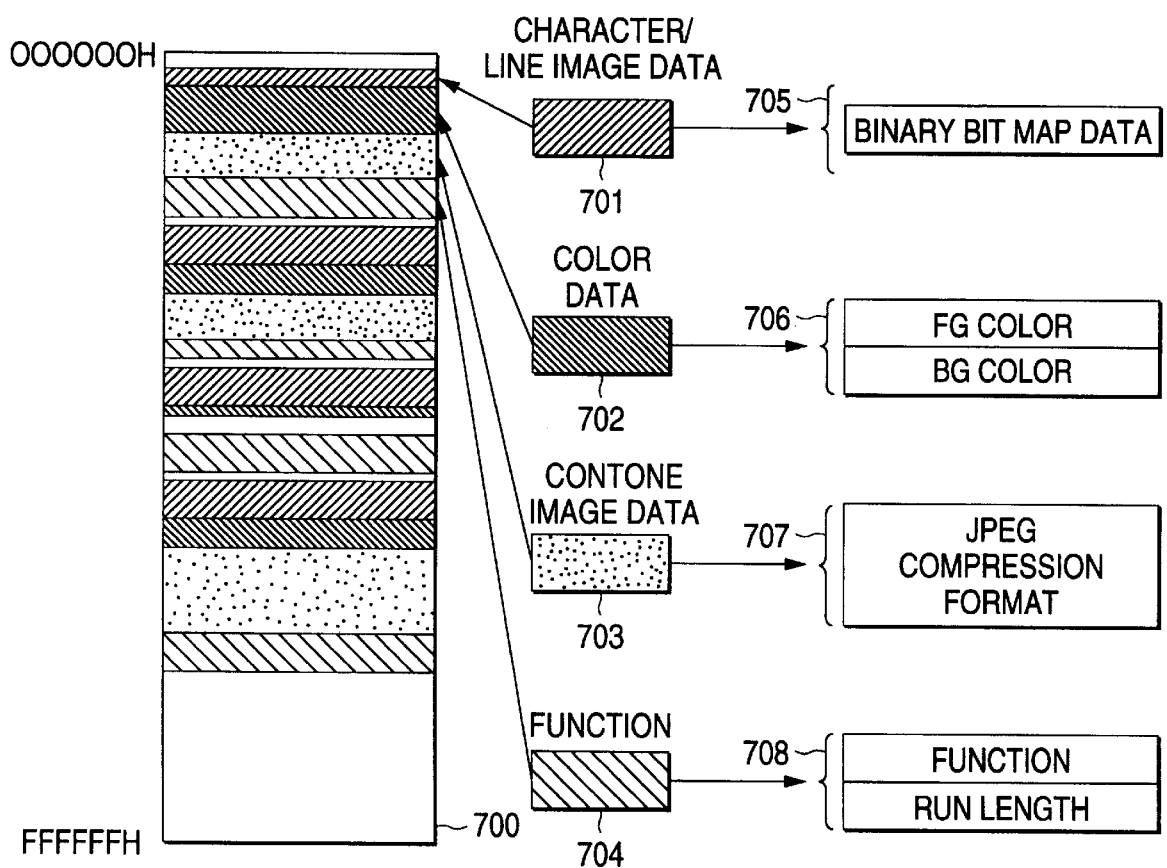
FIG. 19 is a schematic drawing showing a memory map of image storage means contained in the image processing device according to the sixth embodiment of the invention and image data in intermediate format stored in the image storage means.

FIG. 19 is a schematic drawing showing a memory map of the image memory of the image storage means contained in the image processing device according to the sixth embodiment of the invention and image data in intermediate format stored in the image memory of the image storage means. The image data is stored in the image memory 6i of the image storage means 6 of the embodiment as in the memory map 700 shown in FIG. 19. Character/line image data 701 is stored as a binary bit map data format 705 of the binarization coding device. Color data 702 is stored as an 8-bit color pair data format 706 of FG (foreground) color/BG (background) color as color data of the binarization coding device and run length coding device. Contone Image data 703 is stored in a data format 707 of the JPEG coding device. Function data 704 is stored as function data and run length data 708 in a 16-bit format (function data in four bits and run length data in 12 bits).

In the sixth embodiment, upon completion of storing the image data In the intermediate format of 1-page or multipage data generated by the image data conversion means 17 in the image memory 6i of the image storage means 6, as in the third embodiment, image interface means 30 communicates with a target image formation device via a communication/synchronizing signal 10 and the image formation device outputs an image output synchronizing signal via the communication/synchronizing signal 10. When receiving the image output synchronizing signal, image interface means 30 of the image processing device issues an image data output instruction to a control circuit 5, and the image data in the image memory 6i is output through the image interface means 30 to the image formation device. At this time, the image interface means 30 of the sixth embodiment outputs the image data to the image formation device while performing decoding processing for the image data coded in the intermediate format.

Figure 20:
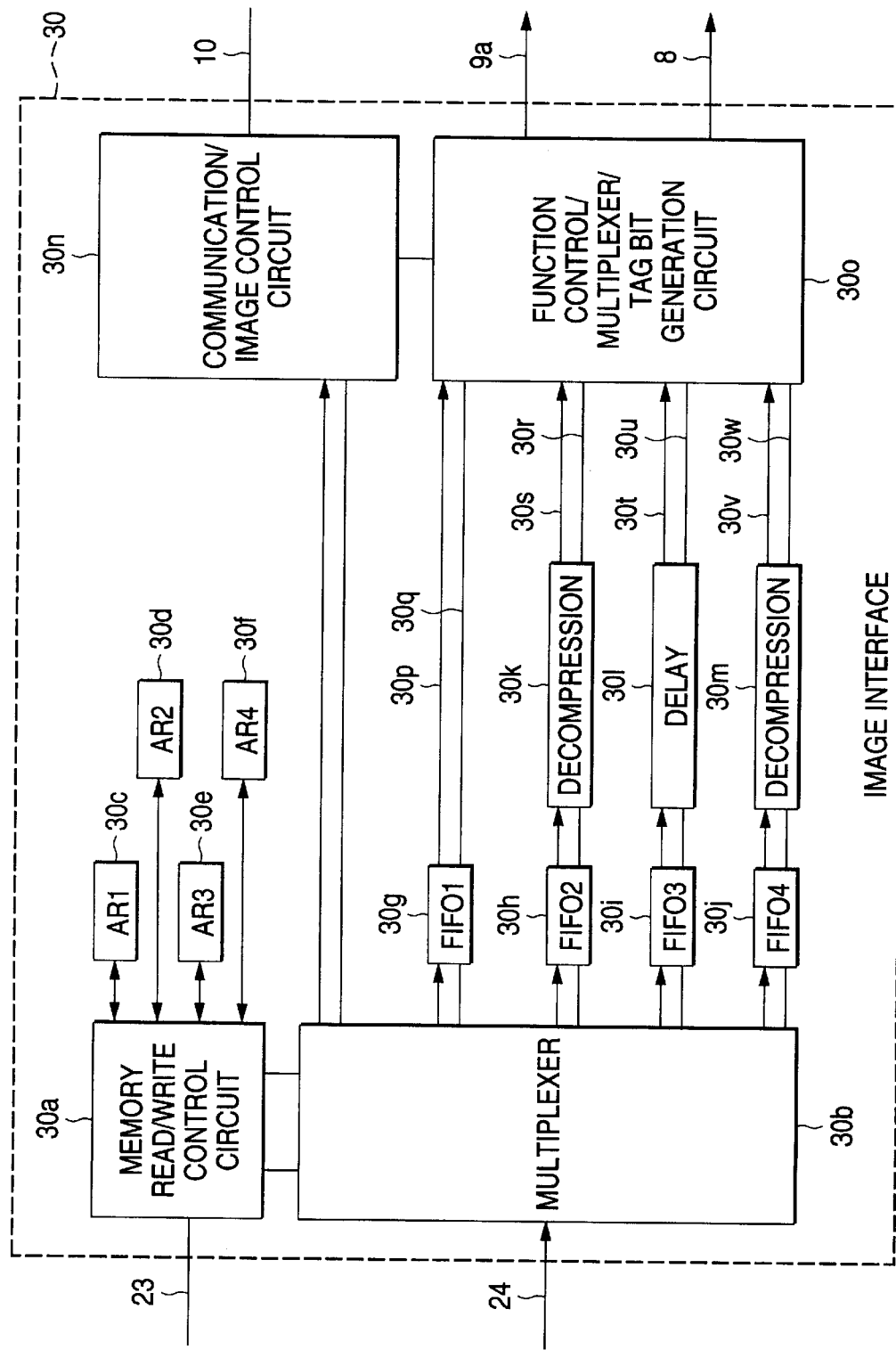
FIG. 20 is a block diagram of image interface means contained in the image processing device according to the sixth embodiment of the invention.

FIG. 20 is a block diagram of the image interface means 30 contained in the image processing device according to the sixth embodiment of the invention.

In the figure, numeral 30a is a memory read/write control circuit and numeral 30b is a multiplexer. AR1 to AR4 are a function data pointer register 30c, a character/line image data pointer register 30d, a color data pointer register 30e, and a contone image data pointer register 30f respectively, which point to the addresses at which image data in intermediate formats stored irregularly in unfixed length as shown on the memory map 700 are to be referenced. At the initialization time, the pointer registers are set to the top addresses of the image data in the intermediate formats on the first page.

When the control circuit 5 issues an image data output instruction to the image formation device, the image interface means 30 reads the image data in the intermediate format from the image memory 6i of the image storage means 6 through the image memory input data signal.

First, data is stored fully in a function data FIFO 30g, character/line image data FIFO 30h, color data FIFO 30i, and contone image data FIFO 30j. When the FIFO become full of the data, a communication/synchronizing signal control circuit 30n issues a synchronizing signal instruction for data output to the image formation device. When receiving the instruction, the image formation device outputs an image data output instruction synchronizing signal via a communication/synchronizing signal 10 to the image processing device. Next, the communication/synchronizng signal control circuit 30n, which received the image data output instruction synchronizing signal, sends a read instruction of the data from the FIFO to a function control/multiplexer/tag hit generation circuit 30o. When receiving the FIFO data read instruction, the function control/multiplexer tag bit generation circuit 30o reads the function data from the function data FIFO 30g and decodes the data for deciding what data is next required and what the function is.

Figures 21, 22:
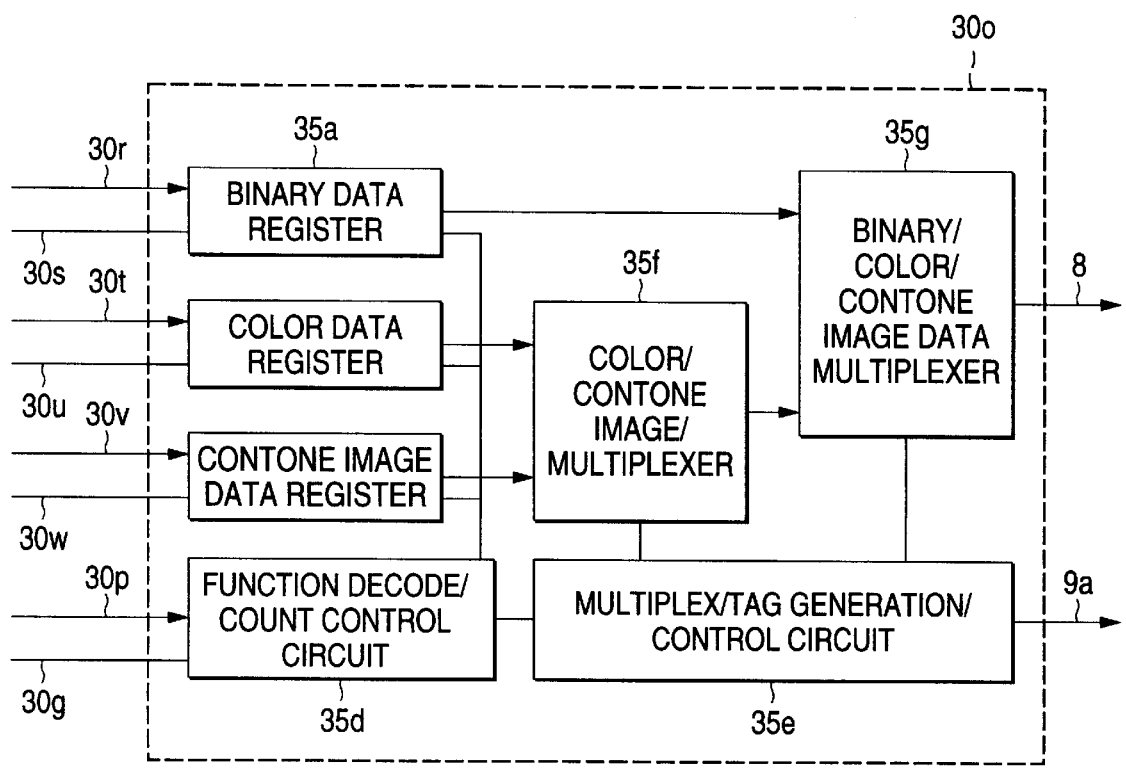
FIG. 21 is an illustration showing an image formation function table for the image interface means contained in the image processing device according to the sixth embodiment of the invention.
FIG. 22 is a block diagram of a function control/multiplexer/tag bit generation circuit of the image interface means contained in the image processing device according to the sixth embodiment of the invention.

FIG. 21 is an illustration showing an image formation function table for the image interface means contained in the image processing device according to the sixth embodiment of the invention.

The function control/multiplexer/tag bit generation circuit 30o decodes the function data as listed in the function table in FIG. 21.

In the figure, use of character data (0) means a data area of a character/line image area and a function of decompressing character/line image data and outputting as image data. The number of pixels to be output is as many as the number of pixels indicated in the run length field of the function data.

Normally, to reference color data, FG color data is referenced as character or graphics foreground color and BG color data is referenced as character or graphics background color. However, FG color data and BG color data with the color data inversion (1) bit set to 1 are referenced in inversion form as background color and foreground color respectively.

Graphics/contone image (2) indicates a graphics or contone image data area. For the graphics data, run length decoding is performed and image data is output. The contone image data is decompressed and image data is output.

The number of output pixels of the image data output by performing run length decoding or decompressing the contone image data is as many as the number of pixels indicated in the run length field of the function data.

For use of character data (0) and graphics/contone image (2), if both of character data use contone image are specified, character/line image data is used for output and the foreground color and background color are selected out of FG color and contone image data. If color data inversion (1) is specified at the same time, output of FG color and contone image data is inverted.

White output (3) indicates that white data is output; it is used for outputting 1-page white space or margins. The number of output pixels of the output image data is as many as the number of pixels indicated in the run length field of the function data.

Next, the function control/multiplexer/tag bit generation circuit 300 decodes the function data thus assigned and reads the data from the FIFOs in response to the indications of the functions. At the same time, it performs decompression processing and outputs the image data.

Data is read into the FIFOs in a non-full condition from which data has been read, repeatedly in order; the FIFOs are controlled so that they are always kept full until completion of 1-page image output.

The image generation processing basically is performed for each line and all line data Is repeatedly output, thereby completing 1-page image data output.

FIG. 22 is a block diagram of the function control/multiplexer/tag bit generation circuit 30o of the image interface means 30 contained in the image processing device according to the sixth embodiment of the invention.

In the figure, a binary data register 35a is a register for temporarily holding character/line image area data decompressed and output by a character/line image data decompression circuit 30k, a color data register 35b is a register for temporarily holding color data output by a color data delay circuit 301, and a contone image data register 35c is a register for temporarily holding contone image area data decompressed and output by a contone image data decompression circuit 30m. A function decode/count control circuit 35d temporarily holds and decodes function data provided as output of the function data FIFO 30g and executes the functions as listed in the function table in FIG. 21 by giving instructions to the binary data register 35a, the color data register 35b, the contone image data register 35c, and a multiplex/tag generation control circuit 35e. At the same time, it reads data required for function execution into any of the binary data register 35a, the color data register 35b, and the cantons image data register 35c.

Next, for example, to execute the color data output function, the function decode/count control circuit 35d reads color date from the color data register 35b, outputs the color data through a color/contone image multiplexer 35f, and outputs the color data output through the color/contone image multiplexer 35f through a binary/color/contone image data multiplexer 35g.

The function decode/count control circuit 35d has an internal counter used to count function execution pixels and counts the number of execution pixels of a single function indicated in the run length field of the function data. When execution of the function is counted by the number of execution pixels given by the counter, the function execution is terminated and new function data is read and at the same time, the data required for the next function execution is read into any of the binary data register 35a, the color data register 35b, and the contone image data register 35c, then the next function is executed in a similar manner.

If the function is a function indicating character/line image data output, contone image data output, or their combination output, it is processed in a similar manner and the raster image of the target image data can be provided. At the same time, the multiplex/tag generation control circuit 35e recognizes which of binary data and color data/contone image data in output by the executed function, and generates the raster image of the target image data. At the same time, it generates tag bits as listed in the function table in FIG. 11 and outputs the bits in synchronization with the image data. In FIG. 22, numeral 30p denotes a function data FIPO output signal, numeral 30q denotes a function data FIFO control signal, numeral 30r is a character/line image data decompression circuit output signal, numeral 30s denotes a character/line image data decompression circuit control signal, numeral 30t denotes a color data delay circuit output signal, numeral 30u denotes a color data delay circuit control signal, numeral 30v denotes a contone image data decompression circuit output signal, and numeral 30w denotes a contone image data decompression circuit control signal.

In a similar configuration to that of the sixth embodiment, an MMR coding device may be used for character/line image and graphics areas and a DCT coding device, etc., may be used for a contone image area.

According to the invention, color conversion processing or color matching processing can be performed efficiently for image elements having different color space attributes, so that image formation processing can be performed at high speed.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing device comprising:
    means for expanding code image data to bit map image data to be used for image formation;
    means for storing the bit map image data to which the code image data is expanded by said expansion means;
    means for generating a signal indicating a color space attribute representing the bit map image data stored in said storage means for each pixel and indicating a type of color space; and
    means for making color conversion of said each pixel from the color space indicated by the signal generated by said means for generating to a color space dependent on an image formation device,
    wherein the means for making color conversion provides conversion for a plurality of different bit map color space/image formation device color space pairs.

2. The image processing device as claimed in claim 1, wherein the color space attribute indicates the type of color space.

3. The image processing device as claimed in claim 2, wherein the color space attribute is the type of color space dependent on a device generating the code image data.

4. The image processing device as claimed in claim 1, further comprising image formation means for forming an image of the bit map image data with each pixel subjected to color conversion by said color conversion means.

5. The image processing device an claimed in claim 2, wherein said color conversion means executes color conversion in synchronization with image formation speed.

6. The image processing device as claimed in claim 1, further comprising means for storing the color space type generated by said generation means, wherein said color conversion means executes color conversion from the color space type stored in said color space type storage means.

7. The image processing device as claimed in claim 1, wherein said generation means generates the color space type from a command of the code image data.

8. An image processing method comprising the steps of:
   expanding code image data to bit map image data to be used for image formation;
   storing the bit map image data to which the code image data is expanded in said expanding step;
   generating a signal indicating a color space attribute representing the bit map image data stored in said storing step for each pixel and indicating a color space type; and
   making color conversion of said each pixel from the color space indicated by the signal generated in the generating step to a color space dependent on an image formation device,
   wherein making color conversion includes providing conversion for a plurality of different bit map color space/image formation device color space pairs.

9. The image processing method of claim 8, wherein the type of color space is dependent on a device generating the code image data.

10. The image processing method of claim 8, further comprising the step of forming an image of the bit map image data with each pixel subjected to color conversion.

11. The image processing method of claim 8, wherein making color conversion includes making color conversion in synchronization with the image formation speed.

12. An image processing device for use with at least one host processor comprising:
   a communication link that transmits data to and from the at least one host processor;
   an image expander that performs image expansion processing on the data transmitted from the at least one host computer and outputs expanded image data;
   an image storage that stores the expanded image data;
   an image interface that generates a signal indicating a color space and color space type of the expanded image data stored in the image storage; and
   a color space converter that converts the expanded image data from the expanded image data color space indicated by the signal generated by the image interface to an image formation device color space dependent on an image formation device,
   wherein the color space converter provides conversion for a plurality of different expanded image data color space/image formation device color space pairs.

13. The image processing device of claim 12, wherein the expanded image data color space is dependent on a type of data transmitted from the host processor.

14. The image processing device of claim 12, wherein the color space converter performs color conversion in synchronization with the image formation speed of the image forming device.

15. The image processing device of claim 12, further comprising at least one color space type storage that stores the color space type generated by the image interface, wherein the color space converter executes color conversion from the color space stored in the at least one color space type storage to the color space of the image formation device.

* * * * *